US012636648B2

(12) United States Patent
Lillis et al.

(10) Patent No.: US 12,636,648 B2
(45) Date of Patent: May 26, 2026

(54) LIQUID HANDLING DEVICE

(71) Applicant: Osler Diagnostics Limited, Oxford (GB)

(72) Inventors: Barry Lillis, London (GB); Steven Green, Oxford (GB); Vincent Linden, Oxford (GB); Konstantinos Psarros, Oxford (GB)

(73) Assignee: Osler Diagnostics Limited, Oxford (GB)

( * ) Notice: Subject to any disclaimer, the term of this patent is extended or adjusted under 35 U.S.C. 154(b) by 904 days.

(21) Appl. No.: 17/916,000

(22) PCT Filed: Mar. 30, 2021

(86) PCT No.: PCT/EP2021/058365
§ 371 (c)(1),
(2) Date: Sep. 29, 2022

(87) PCT Pub. No.: WO2021/198298
PCT Pub. Date: Oct. 7, 2021

(65) Prior Publication Data

US 2023/0147248 A1 May 11, 2023

(30) Foreign Application Priority Data

Mar. 31, 2020 (GR) .............................. 20200100163
May 14, 2020 (GB) ..................................... 2007131

(51) Int. Cl.
*B01L 3/00* (2006.01)

(52) U.S. Cl.
CPC ........... *B01L 3/502738* (2013.01); *B01L 3/52* (2013.01); *B01L 2200/141* (2013.01); (Continued)

(58) Field of Classification Search
CPC ................. B01L 3/502738; B01L 3/52; B01L 2200/141; B01L 2200/16; (Continued)

(56) References Cited

U.S. PATENT DOCUMENTS

2002/0071788 A1* 6/2002 Fujii .................. B01L 3/50273 422/131
2005/0255000 A1* 11/2005 Yamamoto ............ B82Y 30/00 422/68.1

(Continued)

FOREIGN PATENT DOCUMENTS

EP 1 593 968 A2 11/2005

OTHER PUBLICATIONS

International Search Report for International Application No. PCT/EP2021/058365 dated Jul. 8, 2021.

*Primary Examiner* — Jennifer Wecker
*Assistant Examiner* — Britney N. Washington
(74) *Attorney, Agent, or Firm* — Knobbe, Martens, Olson & Bear, LLP

(57) ABSTRACT

The present disclosure relates to a liquid handling device, methods of operating a liquid handling device, a method of performing a diagnostic test, a computer program and a system. In particular, the liquid handling device is capable of controllable bi-directional or multi-directional flow of reagents across one or more reaction zones allowing rapid, precise and controllable quenching of reactions and/or biological interactions.

7 Claims, 16 Drawing Sheets

100

(52) U.S. Cl.
CPC ... *B01L 2200/16* (2013.01); *B01L 2300/0867* (2013.01); *B01L 2400/0655* (2013.01)

(58) Field of Classification Search
CPC ..... B01L 2300/0867; B01L 2400/0655; B01L 2200/10; B01L 2300/0816; B01L 2400/0487
See application file for complete search history.

(56) References Cited

U.S. PATENT DOCUMENTS

2009/0291435 A1* 11/2009 Unger .................... C12Q 1/686 435/6.19
2011/0177547 A1* 7/2011 Xia .......................... G01N 1/34 73/863.61

* cited by examiner

LIQUID HANDLING DEVICE

The present disclosure relates to a liquid handling device, methods of operating a liquid handling device, a method of performing a diagnostic test, a computer program and a system. In particular, the liquid handling device is capable of controllable bi-directional or multi-directional flow of reagents across one or more reaction zones allowing rapid, precise and controllable quenching of reactions and/or biological interactions.

BACKGROUND

Diagnostic tests, such as immunoassays, are often used for the detection of a specific analyte within a sample. For example, pairs of antibodies that can bind to an analyte to form a sandwich that is detectable by means of an enzyme or label on one or more of the antibodies are well known and available for a wide range of different analytes of interest. Antibodies to a particular biomarker, such as testosterone or cortisol, may be used to test levels of these substances in saliva, blood or urine samples. The presence of the analyte is then determined using, for example, electrochemical measurements or fluorescence measurements. Many electrochemical measurement techniques are known to the skilled person such electrochemical impedance spectroscopy, differential pulse voltammetry, square wave voltammetry, cyclic voltammetry, chronoamperometry, open circuit potential measurement and chronopotentiometry.

Point-of-care detection brings a diagnostic test conveniently and immediately to a subject, allowing better and faster clinical decisions to be made. However, integration of diagnostic tests into a point-of-care device or system is challenging. Preparation of a sample for an immunoassay may require mixing of multiple solutions and reagents, with precise control of volumes and mixing times. Further, the device is ideally automated to obviate the need for a medical professional to be present.

Existing liquid handling devices typically flow multiple liquids (such as sample liquids, reagents or wash buffers) across measurement chambers, reaction zones or other detection means in the same flow direction (i.e. different liquids are flowed through the same conduits and parts of the device sequentially). This can cause issues with contamination since some of the liquid or reagent involved in the previous step may still be present in the conduit, measurement chambers, reaction zones or other detection means when the next liquid or reagent is added. This contamination can reduce the accuracy of the diagnostic assay.

Existing liquid handling devices which flow multiple liquids across measurement chambers, reaction zones or other detection means in the same flow direction are not capable of providing rapid, precise and controllable quenching of reactions and/or biological reactions in the measurement chambers, reaction zones or other detection means. This is because sequential linear flow of multiple reagents in the same direction does not remove the previous liquid or analyte from the measurement chambers, reaction zones or other detection means sufficiently quickly.

Thus, there is a need to provide improved liquid handling devices capable of performing liquid handling operations for use in point-of-care diagnostic tests. In particular, there is a need to provide rapid, precise and controllable quenching of reactions and/or biological interactions in the measurement chamber, reaction zone or other detection mean of liquid handling devices.

SUMMARY OF THE INVENTION

This summary introduces concepts that are described in more detail in the detailed description. It should not be used to identify essential features of the claimed subject matter, nor to limit the scope of the claimed subject matter.

Immunoassays rely on delivery of liquids in a controlled manner. The volume of the liquid delivered and the time of interactions are critical to the success and reproducibility of the assay. In addition, heterogeneous immunoassays require wash steps, to remove unbound antibodies, unbound antigen and enzyme tags, from the detection surfaces. Reagents can be trapped in the liquid flow path and then interact in nonspecific reactions. This can increase the background signal which reduces the assay sensitivity, dynamic range and precision. Assay performance can be significantly improved by using different flow paths and/or different liquid flow directions to add reagents that can potentially cross-react.

Configurations of liquid handling devices which provide bi-directional flow allows rapid, precise and controllable quenching of reactions and/or biological interactions in the measurement chamber. The use of conduits with different flow directions also provides reduced contamination of each liquid during different method steps (i.e. reduced contamination of sample liquid in a wash step). This may not be readily achievable with known fluid handling devices, such as conventional microfluidic devices.

In one aspect a liquid handling device may comprise a sample chamber for receiving a sample; a measurement chamber for performing one or more measurements on the sample wherein the measurement chamber comprises a reaction zone; a first liquid reagent chamber; a sample chamber conduit which fluidically connects the sample chamber to the measurement chamber; a sample chamber conduit valve for opening and closing the sample chamber conduit; a first liquid reagent chamber conduit which fluidically connects the first liquid reagent chamber to the measurement chamber in an alternate flow direction to the sample chamber conduit; and a first liquid reagent chamber conduit valve for opening and closing the first liquid reagent chamber conduit.

The flow direction of the first liquid reagent chamber conduit into the measurement chamber may be at least ninety degrees to the flow direction of the sample chamber conduit into the measurement chamber. In one embodiment the flow direction of the first liquid reagent chamber conduit into the measurement chamber is opposite to the flow direction of the sample chamber conduit into the measurement chamber. In some embodiments opposite flow direction is equivalent to a second flow direction that is 180 degrees to a first flow direction in the same horizontal plane of the device.

In some embodiments the device further comprises a second liquid reagent chamber; a second liquid reagent chamber conduit which fluidically connects the second liquid reagent chamber to the measurement chamber in an alternate flow direction to the sample chamber conduit; and a second liquid reagent chamber conduit valve for opening and closing the second liquid reagent chamber conduit.

In some embodiments the second liquid reagent chamber conduit fluidically connects to the measurement chamber in an alternate direction to both the sample chamber conduit and the first liquid reagent chamber conduit.

In some embodiments the second liquid reagent chamber conduit is fluidically connected to the first liquid reagent chamber conduit thereby providing a combined conduit, fluidically connecting both the first liquid reagent chamber and second liquid reagent chamber to the measurement chamber. In some embodiments the flow direction of the combined conduit into the measurement chamber is at least ninety degrees to the flow direction of the sample chamber conduit into the measurement chamber.

In some embodiments the flow direction of the combined conduit into the measurement chamber is opposite to the flow direction of the sample chamber conduit into the measurement chamber. In some embodiments opposite flow direction is equivalent to a second flow direction that is 180 degrees to a first flow direction in the same horizontal plane of the device.

In some embodiments the flow direction of the second liquid reagent chamber conduit into the measurement chamber is at least ninety degrees to the flow direction of the sample chamber conduit and/or the first liquid chamber conduit into the measurement chamber.

In some embodiments the flow direction of the second liquid reagent chamber conduit into the measurement chamber is opposite to the flow direction of the sample chamber conduit and/or the first liquid chamber conduit into the measurement chamber. In some embodiments opposite flow direction is equivalent to a second flow direction that is 180 degrees to a first flow direction in the same horizontal plane of the device.

In some embodiments the reaction zone comprises one or more electrodes. In some embodiments the one or more electrodes comprise one or more electrodes selected from the list: counter electrode, reference electrode and working electrode. In some embodiments the one or more electrodes comprise at least one working electrode.

In some embodiments the device comprises two or more measurement chambers, each of which is fluidically connected to the sample chamber and each of which is fluidically connected to the first liquid reagent chamber, wherein the device comprises a corresponding number of sample chamber conduit valves and/or first liquid reagent chamber valves for independent control of the flow of sample liquid and/or first liquid reagent into each measurement chamber.

In some embodiments the device further comprises a second liquid reagent chamber and wherein each of the measurement chambers is fluidically connected to the second liquid reagent chamber, and wherein the device comprises a corresponding number of second liquid reagent chamber conduit valves for independent control of the flow of second liquid reagent into each measurement chamber.

In some embodiments the second liquid reagent chamber conduit is fluidically connected to the first liquid reagent chamber conduit thereby providing one or more combined conduits fluidically connecting both the first liquid reagent chamber and second liquid reagent chamber to each measurement chamber.

In some embodiments the flow of any one or more of the sample liquid, first liquid reagent and/or the second liquid reagent into each of the measurement chambers can be independently controlled to regulate the residence time of each liquid in each of the measurement chambers. In one embodiment the flow of the sample liquid into each of the measurement chambers can be independently controlled to regulate the residence time of the sample liquid in each of the measurement chambers. In one embodiment the flow of the first liquid reagent into each of the measurement chambers can be independently controlled to regulate the residence time of the first liquid reagent in each of the measurement chambers. In one embodiment the flow of the second liquid reagent into each of the measurement chambers can be independently controlled to regulate the residence time of the second liquid reagent in each of the measurement chambers.

In some embodiments the flow of any one or more of the sample liquid, first liquid reagent and/or the second liquid reagent is controlled such that the residence time of each liquid is a predetermined period of time. In one embodiment the flow of the sample liquid is controlled such that the residence time of the sample liquid is a predetermined period of time. In one embodiment the flow of the first liquid reagent is controlled such that the residence time of the first liquid reagent is a predetermined period of time. In one embodiment the flow of the second liquid reagent is controlled such that the residence time of the second liquid reagent is a predetermined period of time.

In some embodiments the device further comprises: a mixing zone located between the sample chamber and the measurement chamber and wherein the mixing zone is fluidically connected to both the sample chamber and the measurement chamber.

In some embodiments the mixing zone comprises a mixing chamber, wherein the mixing chamber is fluidically connected to the sample chamber conduit and to the measurement chamber by a mixing chamber conduit.

In some embodiments the device further comprises: a third liquid reagent chamber; a third liquid reagent chamber conduit which fluidically connects the third liquid reagent chamber to the mixing zone, optionally wherein the third liquid reagent chamber conduit connects to the mixing zone in an alternate flow direction to the sample chamber conduit; and a third liquid reagent chamber conduit valve for opening and closing the third liquid reagent chamber conduit.

In some embodiments the flow of the third liquid reagent into the mixing zone can be independently controlled to regulate the residence time of the third liquid reagent in the mixing zone. In some embodiments the flow of the third liquid reagent is controlled such that the residence time of the third liquid reagent is a predetermined period of time.

In some aspects of the invention one or more of the first liquid reagent chamber, the second liquid reagent chamber and the third liquid reagent chamber may be referred to as auxiliary chambers. In one embodiment the first liquid reagent chamber is referred to as an auxiliary chamber. In one embodiment the second liquid reagent chamber is referred to as an auxiliary chamber. In one embodiment the third liquid reagent chamber is referred to as an auxiliary chamber.

In one aspect a method of performing a diagnostic assay may comprise sequentially moving liquid from a sample chamber to a measurement chamber and moving a first liquid reagent into the measurement chamber from an alternate flow direction, the method including: filling the sample chamber with sample liquid; moving sample liquid from the sample chamber to the measurement chamber; retaining the sample liquid in the measurement chamber for a predetermined period of time, moving a first liquid reagent from a first liquid reagent chamber into the measurement chamber in an alternate flow direction to the sample chamber liquid and taking a measurement, optionally wherein the first liquid reagent is retained in the measurement chamber for a predetermined period of time.

In some methods the first liquid reagent is removed from the measurement chamber before the measurement is taken.

In some embodiments the method further comprises a step of moving liquid from a second liquid reagent chamber to the measurement chamber in an alternate flow direction to sample liquid.

In one aspect a method of performing a diagnostic assay may comprise sequentially moving liquid from a sample chamber to a measurement chamber and moving a first and second liquid reagent into the measurement chamber from an alternate flow direction, the method including: filling the sample chamber with sample liquid; moving sample liquid from the sample chamber to the measurement chamber; retaining the sample liquid in the measurement chamber for a predetermined period of time, moving a first liquid reagent from a first liquid reagent chamber into the measurement chamber in an alternate flow direction to the sample liquid; moving a second liquid reagent from a second liquid reagent chamber into the measurement chamber in an alternate flow direction to the sample liquid and performing a measurement, optionally wherein the first and second liquid reagents are each retained in the measurement chamber for a predetermined period of time.

In some methods the second liquid reagent is removed from the measurement chamber before the measurement is taken.

In one aspect a method of performing a diagnostic assay may comprise sequentially moving liquid from a sample chamber to a measurement chamber and moving a first and second liquid reagent into the measurement chamber from an alternate flow direction, the method including: filling the sample chamber with sample liquid; moving sample liquid from the sample chamber to the measurement chamber; retaining the sample liquid in the measurement chamber for a predetermined period of time, moving a first liquid reagent from a first liquid reagent chamber into the measurement chamber in an alternate flow direction to the sample liquid; moving a second liquid reagent from a second liquid reagent chamber into the measurement chamber in an alternate flow direction to the sample liquid; moving a further volume of the first liquid reagent from the first liquid reagent chamber into the measurement chamber in an alternate flow direction to the sample liquid and performing a measurement, optionally wherein the first and second liquid reagents are each retained in the measurement chamber for a predetermined period of time.

In some methods the flow direction of the first liquid reagent and/or the second liquid reagent is at least ninety degrees to the flow direction of the sample liquid into the measurement chamber, preferably wherein the flow direction of the first liquid reagent and/or second liquid reagent is opposite to the flow direction of the sample liquid.

In some embodiments the methods further comprise a step of mixing the sample liquid with one or more additional reagents before moving the sample liquid into the measurement chamber.

In some methods the sample liquid is mixed in a mixing zone with a third liquid reagent from a third liquid reagent chamber.

The invention also provides a method of implementing any of the methods of the invention on any device of the invention as set out above.

In some embodiments the first liquid reagent is any liquid composition suitable for use as a washing liquid in immunoassays, for example a wash buffer. In some embodiments the first liquid reagent is a liquid comprising one or more reagents selected from the list of a pH buffer (e.g. PBS, Tris, carbonate/bicarbonate, HEPES, MOPS, MES), a salt solution (e.g. NaCl, KCl, MgCl2), a detergent (e.g. Tween 20, Tween 80, Triton-X, CHAPS) and a stabilizer/blocking agent (e.g. BSA, casein).

In some embodiments the first liquid reagent is Tris-buffered saline (TBS) and phosphate-buffered saline (PBS) containing 0.05% (v/v) Tween®-20.

In some embodiments the second liquid reagent is a detection reagent for use in immunoassays. In some embodiments the second liquid reagent comprises one or more reagents selected from DAB (3,3'-diaminobenzidine), metal-enhanced DAB, AEC (3-amino-9-ethylcarbazole), BCIP (5-bromo-4-chloro-3-indolyl phosphate), NBT (nitro-blue tetrazolium chloride), TMB (3,3',5,5'-tetramethylbenzidine), ELF (enzyme-labelled fluorescence) and OPD (ophenylenediamine dihydrochloride), preferably wherein the second liquid reagent comprises 3,3',5,5'-Tetramethylbenzidine (TMB).

In some embodiments the predetermined period of time is from 1 to 180 seconds (e.g. 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179 or 180 seconds).

In some embodiments the predetermined period of time is from 1 to 60 seconds (e.g. 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 seconds).

In some embodiments the predetermined period of time is from 10 to 30 seconds (e.g. 10, 11, 12, 13, 14, 15, 16, 17, 18, 19, 20, 21, 22, 23, 24, 25, 26, 27, 28, 29 or 30 seconds).

In some embodiments the predetermined period of time is from 60 to 180 seconds (e.g. 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179 or 180 seconds).

In one aspect, a cartridge is provided for a microfluidic system, where the reagents are stored, integrated within the cartridge in sealed reservoirs so as not to flow into the microfluidic device until dictated by operation. This allows for long term storage of cartridges containing reagents, while protecting the reagents and microfluidic device from contamination and degradation. An advantage of the devices described herein includes a valve in a microfluidic system having simple construction geometry, allowing cost-effective manufacture of valve features and components. Another advantage is a very small volume, appropriate to the smaller volumes of fluid being employed in microfluidic devices, as compared to any non-integrated off-device valve.

In one aspect, a liquid handling device may comprise a sample chamber for receiving a sample, a measurement chamber for performing one or more measurements on the sample wherein the measurement chamber comprises a reaction zone and a first liquid reagent chamber fluidically connected to the measurement chamber in an alternate flow direction to the sample chamber. a variable pressure source conduit for connecting the measurement chamber to a variable pressure source; a sample chamber conduit which fluidically connects the sample chamber to the measurement chamber; a sample chamber conduit valve for opening and closing the sample chamber conduit; a respective measurement chamber conduit for each measurement chamber, wherein each respective measurement chamber conduit fluidically connects the respective measurement chamber to the measurement chamber; and a respective measurement chamber conduit valve for opening and closing each respective measurement chamber conduit.

The liquid handling device allows a first or second liquid reagent to be transferred to the measurement chamber in an alternate flow direction to the sample liquid. This configuration allows liquid reagents (such as buffers or detection reagents) to be transferred to the measurement chamber through separate conduits which have not previously had sample liquid flowed through them. This configuration allows rapid, precise and controllable quenching of reactions and/or biological interactions in the measurement chamber. The use of conduits with different flow directions also provides reduced contamination of each liquid during different method steps (i.e. reduced contamination of sample liquid in a wash step). This may not be readily achievable with known fluid handling devices, such as conventional microfluidic devices.

The liquid handling device allows a sample to be transferred from the sample chamber into the measurement chamber by reducing the pressure in the measurement chamber relative to the sample chamber. Precise control of the volume of sample transferred into the measurement chamber is possible by controlling the pressure change in the measurement chamber. In the measurement chamber, the sample liquid may react or mix with a reagent. The device allows the sample to be held in the measurement chamber for as long as necessary, for example for a duration of time needed to complete a reaction with a reagent. This may not be readily achievable with known fluid handling devices, such as conventional microfluidic devices.

The sample may be held in the measurement chamber while a measurement is performed, for example as part of a diagnostic test such as an immunoassay. Again, precise control of the volume of sample transferred into the measurement chamber and residence time in the measurement chamber are possible.

The liquid handling device may be provided with or without a variable pressure source. That is to say that a variable pressure source may be integrated into the liquid handling device, but is preferably reversibly connected to the liquid handling device and as such may be provided separately.

A variable pressure source is a pressure source that can apply or provide both positive and negative pressure changes. For example, the variable pressure source may be a syringe and may be controlled by a stepper motor. Other variable pressure sources and ways of controlling variable pressure sources are known to the skilled person.

The liquid handling device is not limited to having only one measurement chamber or only one variable pressure source.

The measurement chamber may be arranged to receive a fluid from the sample chamber when the sample chamber conduit valve is open and a negative pressure change is applied to the one or more measurement chambers.

The reagent chambers may store reagents such as an antibody or protein solution, antibody or protein powder, buffer solution, an enzyme substrate such as 3,3',5,5'-tetramethylbenzidine "TMB," and so on, for mixing or reacting with the sample in order to facilitate a measurement on the sample in the measurement chamber, for example to perform a diagnostic test on the sample.

The reagents in the reagent chambers may be readily mixed with the sample by controlling pressure changes in the liquid handling device. By providing a measurement chamber surrounded by one or more reagent chambers, the device facilitates complex mixing or washing operations, for example operations with multiple steps each requiring precise volume control and timing that may not be readily achieved using known fluid handling devices.

The one or more measurement chambers may comprise a first measurement chamber for performing a first measurement on the sample and a second measurement chamber for performing a second measurement on the sample. As such, the liquid handling device may comprise a first measurement chamber conduit which fluidically connects the first measurement chamber to the sample chamber or the mixing chamber; a second measurement chamber conduit which fluidically connects the second measurement chamber to the sample chamber or the mixing chamber; a first measurement chamber conduit valve for opening and closing the first measurement chamber conduit; and a second measurement chamber conduit valve for opening and closing the second measurement chamber conduit.

As such, a single liquid handling device may be configured to receive only one sample in the sample chamber yet perform multiple measurements or diagnostic tests for determining multiple properties of the sample.

The one or more reagent chambers may comprise one or more first dedicated reagent chambers for reagents to be used only in a diagnostic test to be performed in the first measurement chamber, one or more second dedicated reagent chambers for reagents to be used only in a diagnostic test to be performed in the second measurement chamber, and one or more shared reagent chambers for reagents to be used in the diagnostic tests to be measured in both the first and second measurement chambers.

Ordinarily, separate measurement chambers would each require their own separate reagent sources, however, by providing a shared reagent chamber that provides a reagent, such as a buffer solution, common to two separate diagnostic tests or measurements, a more compact liquid handling device may be provided. The same dedicated reagent chambers store reagents, such as specific antibodies or proteins, that may be selectively mixed with the sample for particular diagnostic tests or measurements, providing the device with a broader range of functionality.

The liquid handling device comprising one or more reagent chambers may further comprise a mixing chamber for mixing the sample with a reagent from one of the one or more reagent chambers. As such, the device also comprises a mixing chamber conduit, wherein the mixing chamber conduit fluidically connects the mixing chamber to the measurement chamber; and a mixing chamber conduit valve for opening and closing the mixing chamber conduit.

Once a reagent is combined with the sample, the resulting combination may be shuttled (transferred back and forth) between the measurement chamber and mixing chamber to accelerate mixing of the reagent and sample (homogenise the reagent and sample) or accelerate dissolution of the reagent in the sample or other liquid.

The liquid handling device may further comprise a waste chamber and a waste chamber conduit, wherein the waste chamber conduit fluidically connects the waste chamber to the measurement chamber and/or the mixing chamber.

The waste chamber may be used to safely store excess sample and/or reagents, for example after the liquid handling device has been used to perform a measurement on the sample. Further, sample may be overprovided to the mixing chamber, and then transferred into another chamber such as a measurement chamber in a precise quantity, while the excess sample is expelled to the waste chamber. The precisely measured sample can then be transferred to a different chamber with a precise known volume.

The liquid handling device may further comprise a waste chamber conduit valve for opening and closing the waste chamber conduit. Alternatively, the waste chamber conduit may fluidically connect the waste chamber to the mixing chamber via the measurement chamber.

Thus, sample can be transferred directly from the measurement chamber to the waste chamber after a measurement has been performed.

At least one of the one or more measurement chambers may comprise a plurality of electrodes. The plurality of electrodes may be for performing an electrochemical measurement. Alternatively, or in addition, at least one of the one of more measurement chambers may comprise an element for performing an optical measurement, such as a window.

Each conduit valve may be a pinch valve. A pinch valve may be operated by an external actuator that selectively applies pressure to the pinch valve to open or close it. Optionally, the conduit valves may be configured in a circular array, so that they can be operated by an actuator with a circular array of actuation elements. A pinch valve is a valve which uses a pinching effect to obstruct fluid flow.

The conduit valves of the devices described above may be configured such that only one valve is open at any given time. The conduit valves of the devices described above may be closed by default.

The chambers of the liquid handling device may comprise gas exchange holes for allowing air or any other ambient gas to enter and exit each chamber to balance a pressure change resulting from liquid (such as a sample or reagent) entering the respective chambers, although this is not essential.

The liquid handling device may be made from conventional materials known to the skilled person such as acrylic, glass, silicon, or polydimethylsiloxane (PDMS), using conventional methods such as chemical etching, laser etching, routing or moulding.

Pressure changes are applied via a variable pressure source conduit of the liquid handling device, and may be applied using a variable pressure source, such as a syringe or any other means suitable for applying positive and negative pressure changes, connected to the variable pressure source conduit. The variable pressure source conduit may be connected to the measurement chamber or mixing chamber. Alternatively, the variable pressure source conduit may be connected to another suitable part of the device to allow for precise control of the pressure changes throughout the device.

The method of operating a liquid handling device, wherein the liquid handling device comprises one or more reagent chambers as described above, may further comprise opening the reagent chamber conduit valve corresponding to one of the one or more reagent chambers; reducing a pressure in the mixing chamber relative to the one of the one or more reagent chambers; and closing the reagent chamber conduit valve corresponding to the one of the one or more reagent chambers.

Thus, a reagent may be transferred from a reagent chamber to the mixing chamber.

The method may further comprise, prior to reducing a pressure in the mixing chamber relative to the one of the one or more reagent chambers, increasing a pressure in the mixing chamber relative to the one of the one or more reagent chambers in order to transfer a liquid in the mixing chamber, such as a sample, into the one of the one or more reagent chambers. Thus, if the one of the one or more reagent chambers comprises a dried or powdered reagent, a liquid in the mixing chamber can be used to suspend or dissolve the reagent and then transfer it into the measurement chamber.

When the liquid handling device comprises a mixing chamber as described above, the method of operating a liquid handling device may further comprise opening the mixing chamber conduit valve; increasing a pressure in the measurement chamber relative to the mixing chamber; reducing a pressure in the measurement chamber relative to the mixing chamber and closing the mixing chamber conduit valve.

Thus, a mixture, such as a mixture of a sample and a reagent, may be shuttled between the measurement chamber and mixing chamber or between the one or more reagent chambers and mixing chamber to accelerate mixing of the reagent and sample (e.g. homogenise reagent and sample) or accelerate dissolution of the reagent in the sample.

The method may further comprise repeating increasing a pressure in the mixing chamber and reducing a pressure in the mixing chamber one or more times before closing the mixing chamber conduit valve.

When the liquid handling device comprises a waste chamber, waste chamber conduit and waste chamber conduit valve as described above, the method of operating a liquid handling device may further comprise closing the one of the respective measurement chamber conduit valves; opening the waste chamber conduit valve; increasing a pressure in the measurement chamber relative to the waste chamber; and closing the waste chamber conduit valve. The method may further comprise closing the one of the respective measurement chamber conduit valves.

Thus, liquid in the measurement chamber may be transferred to the waste chamber where it may be safely stored, for example after the liquid handling device has been used to perform a measurement on the sample.

When the liquid handling device comprises a waste chamber and waste chamber conduit fluidically connecting the waste chamber to the mixing chamber via the measurement chamber the method of operating a liquid handling device may further comprise increasing a pressure in the mixing chamber relative to the waste chamber after performing a measurement on the sample.

Thus, liquid in the mixing chamber may be transferred to the waste chamber where it may be safely stored, for example after the liquid handling device has been used to perform a measurement on the sample.

When the one or more measurement chambers comprise a plurality of electrodes, the method of operating a liquid handling device may further comprise performing an electrochemical measurement on a sample using the plurality of electrodes.

When each conduit valve of the liquid handling device is a pinch valve, the method of operating a liquid handling device may further comprise opening or closing at least one of the pinch valves by operating an actuator. The pinch valves may be configured to only open one-at-a-time (i.e. only one pinch valve is open at any one time).

As will be understood, the methods described above can be performed in combination with each other, and in many different orders or multiple times, as required for a given diagnostic test. The order of each method is not limited to the order in which the features are presented above, and one method need not be completed before another method is begun. For example, a method for mixing may be performed after a sample and reagent are introduced into the measurement chamber but before at least a portion of the sample is transferred to the measurement chamber.

In another aspect, a method of performing a diagnostic test using a liquid handling device as described above comprises filling the sample chamber with a sample and performing one or more of the methods described above. Optionally, the liquid handling device comprises one or more reagent chambers and each of the one or more reagent chambers comprises a respective reagent for the diagnostic test.

In another aspect, a method of operating a liquid handling device may comprise opening of the third liquid reagent chamber conduit valves and increasing or reducing the pressure in the mixing chamber relative to the third liquid reagent chamber by a predetermined amount, thereby enabling transfer of a metered volume of a liquid between the mixing chamber and the third liquid reagent chamber. As such, the liquid handling device comprises a mixing chamber; a third liquid reagent chamber; a third liquid reagent chamber conduit, wherein the third liquid reagent chamber conduit fluidically connects the third liquid reagent chamber to the mixing chamber and a third liquid reagent chamber conduit valve for opening and closing the third liquid reagent chamber conduit. The use of predetermined pressure changes enables transfer of precise volumes of liquid.

Increasing or reducing the pressure in the measurement chamber or mixing chamber relative to an auxiliary chamber by a predetermined amount may comprise applying a predetermined pressure change for a predetermined period of time.

When the pressure in the mixing chamber is increased, transfer of a metered volume of a liquid from the mixing chamber an auxiliary chamber is enabled. When the pressure in the mixing chamber is reduced, transfer of a metered volume of a liquid from the auxiliary chamber to the mixing chamber is enabled.

In another aspect, a computer program may comprise computer-executable instructions which, when executed by a system, cause the system to perform the any of the methods described above.

In another aspect, a system may comprise a processor configured to execute a computer program comprising computer-executable instructions which, when executed by a system, cause the system to perform any of the methods described above.

A system may be a point-of-care system or diagnostic system and/or may be for performing a diagnostic test on a sample.

The system may further comprise one or more of a variable pressure source configured to connect to a liquid handling device; a variable pressure source controller to control the variable pressure source; an actuator configured to selectively open or close each of the plurality of pinch valves and a liquid handling device as described above. The processor may be configured to control the variable pressure source controller to control the variable pressure source in accordance with any of the above described methods. The system may further comprise memory for storing the computer program.

In some embodiments, an alternative flow direction may be at least ninety degrees to a first flow direction when measured in the same horizontal plane of the device. In some embodiments, an alternative flow direction may be from 90 to 180 degrees to a first flow direction when measured in the same horizontal plane of the device. In some embodiments, an alternative flow direction may be 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179 or 180 degrees to a first flow direction when measured in the same horizontal plane of the device.

BRIEF DESCRIPTION OF THE DRAWINGS

Embodiments of the present invention will now be described, by way of example only, with reference to the accompanying drawings, in which.

DETAILED DESCRIPTION OF THE INVENTION

Figure 1A:
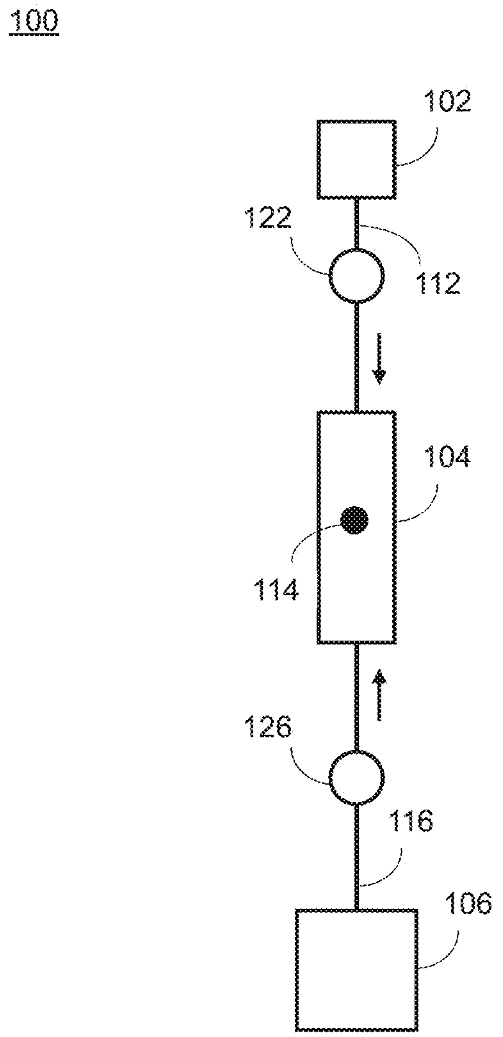
FIG. 1A illustrates a liquid handling device comprising a sample chamber, a measurement chamber and a first liquid reagent chamber fluidically connected to the measurement chamber in an alternate flow direction to the sample chamber.

FIG. 1A illustrates a liquid handling device 100. The liquid handling device 100 comprises a sample chamber 102 for receiving a sample; one or more measurement chambers 104 for performing measurements on the sample, wherein the measurement chamber comprises a reaction zone 114; a sample chamber conduit 112 which fluidically connects the sample chamber 102 to the measurement chamber 104; a sample chamber conduit valve 122 for opening and closing the sample chamber conduit 112; a first liquid reagent chamber 106; a first liquid reagent chamber conduit 116 which fluidically connects the first liquid reagent chamber 106 to the measurement chamber 104 in an alternate flow direction to the sample chamber conduit 112; and a first liquid reagent chamber conduit valve 126 for opening and closing the first liquid reagent chamber conduit 116. In the embodiment shown in FIG. 1A, the first liquid reagent chamber conduit 116 connects to the measurement chamber 104 in the opposite flow direction to the sample chamber conduit 112.

The measurement chamber 104 is arranged to receive a fluid from the sample chamber 102 when the sample chamber conduit valve 122 is open and a negative pressure change is applied to the measurement chamber 104.

The measurement chamber 104 comprises a reaction zone 114, optionally comprising a plurality of electrodes (not illustrated in FIG. 1).

Figure 1B:
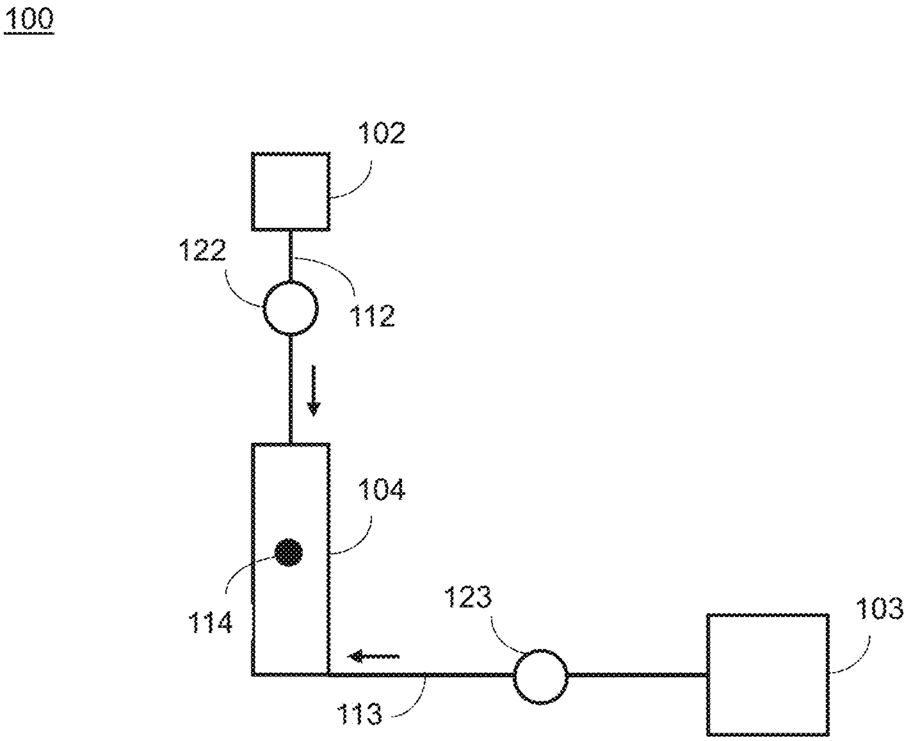
FIG. 1B illustrates a liquid handling device comprising a sample chamber, a measurement chamber and a first liquid reagent chamber fluidically connected to the measurement chamber in an alternate flow direction. This alternative configuration illustrates that the flow direction of the first liquid reagent chamber conduit into the measurement chamber can be at ninety degrees to the flow direction of the sample chamber conduit.

FIG. 1B illustrates a liquid handling device 100 similar to the device illustrated in FIG. 1A, wherein the first liquid reagent chamber conduit 113, enters the measurement chamber 104 in an alternate flow direction to the sample chamber conduit 112. The liquid handling device 100 comprises a sample chamber 102 for receiving a sample; one or more measurement chambers 104 for performing measurements on the sample, wherein the measurement chamber comprises a reaction zone 114; a sample chamber conduit 112 which fluidically connects the sample chamber 102 to the measurement chamber 104; a sample chamber conduit valve 122 for opening and closing the sample chamber conduit 112; a first liquid reagent chamber 103; a first liquid reagent chamber conduit 113 which fluidically connects the first liquid reagent chamber 103 to the measurement chamber 104 in an alternate flow direction to the sample chamber conduit 112; and a first liquid reagent chamber conduit valve 123 for opening and closing the first liquid reagent chamber conduit 113. In the embodiment shown in FIG. 1B, the first liquid reagent chamber conduit 113 connects to the measurement chamber 104 with a flow direction that is 90 degrees to the flow direction of the sample chamber conduit 112, in the same horizontal plane of the device.

Figure 2A:
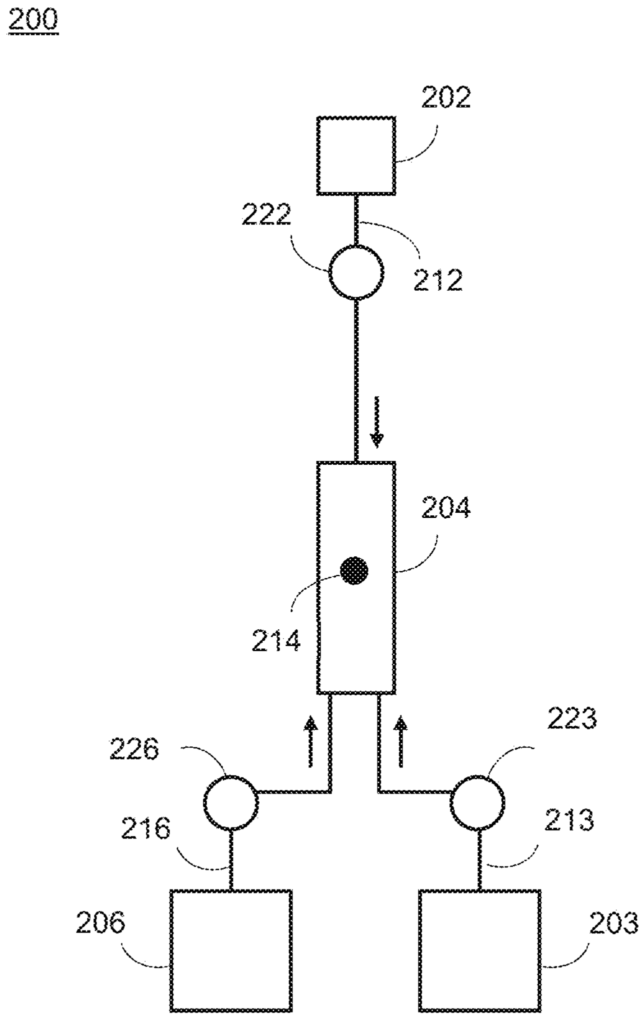
FIG. 2A illustrates a liquid handling device comprising a sample chamber, a measurement chamber and a first liquid reagent chamber and second liquid reagent chamber, both fluidically connected to the measurement chamber in an alternate flow direction to the sample chamber.

FIG. 2A illustrates a liquid handling device 200 similar to the devices illustrated in FIG. 1A and FIG. 1B, further comprising a second fluid reagent chamber. The liquid handling device 200 comprises a sample chamber 202 for receiving a sample; one or more measurement chambers 204 for performing measurements on the sample, wherein the measurement chamber comprises a reaction zone 214; a sample chamber conduit 212 which fluidically connects the sample chamber 202 to the measurement chamber 204; a sample chamber conduit valve 222 for opening and closing the sample chamber conduit 212; a first liquid reagent chamber 206; a first liquid reagent chamber conduit 216 which fluidically connects the first liquid reagent chamber 206 to the measurement chamber 204 in an alternate flow direction to the sample chamber conduit 212; a first liquid reagent chamber conduit valve 226 for opening and closing the first liquid reagent chamber conduit 216; a second liquid reagent chamber 203; a second liquid reagent chamber conduit 213 which fluidically connects the second liquid reagent chamber 203 to the measurement chamber 204 in an alternate flow direction to the sample chamber conduit 212; and a second liquid reagent chamber conduit valve 223 for opening and closing the second liquid reagent chamber conduit 223. In the embodiment shown in FIG. 2A, the first liquid reagent chamber conduit 216 and the second liquid reagent chamber conduit 213 connects to the measurement chamber 204 in the opposite flow direction to the sample chamber conduit 212.

Figure 2B:
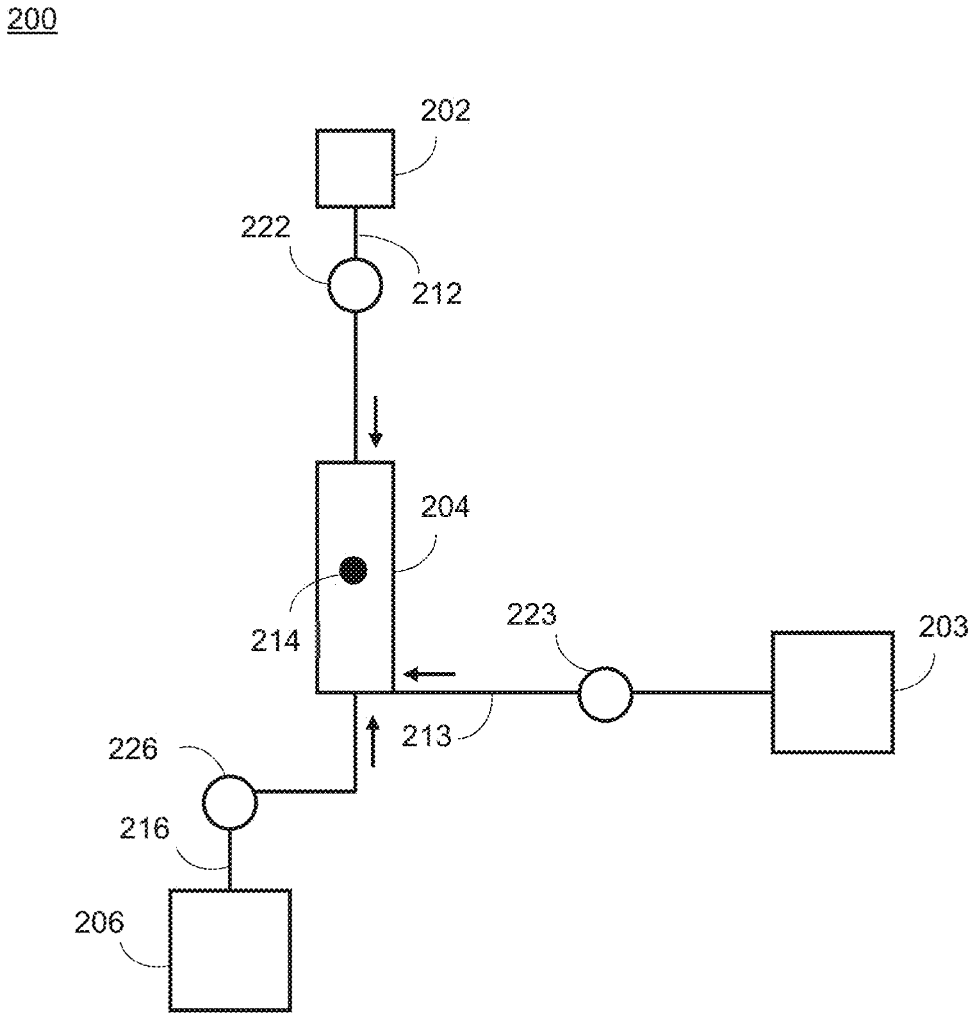
FIG. 2B illustrates a liquid handling device comprising a sample chamber, a measurement chamber and a first liquid reagent chamber and second liquid reagent chamber, both fluidically connected to the measurement chamber in an alternate flow direction to the sample chamber. This alternative configuration illustrates that the flow direction of the first liquid reagent chamber conduit and second liquid reagent chamber conduit into the measurement chamber can be at ninety degrees to the flow direction of the sample chamber conduit and/or at ninety degrees to the flow direction of the other liquid reagent chamber conduit.

FIG. 2B illustrates a liquid handling device 200 similar to the device illustrated in FIG. 2A, wherein the second liquid reagent chamber conduit 213, enters the measurement chamber 204 in an alternate flow direction to both the sample chamber conduit 212 and the first liquid reagent chamber conduit 216. The liquid handling device 200 comprises a sample chamber 202 for receiving a sample; one or more measurement chambers 204 for performing measurements on the sample, wherein the measurement chamber comprises a reaction zone 214; a sample chamber conduit 212 which fluidically connects the sample chamber 202 to the measurement chamber 204; a sample chamber conduit valve 222 for opening and closing the sample chamber conduit 212; a first liquid reagent chamber 206; a first liquid reagent chamber conduit 216 which fluidically connects the first liquid reagent chamber 206 to the measurement chamber 204 in an alternate flow direction to the sample chamber conduit 212; a first liquid reagent chamber conduit valve 226 for opening and closing the first liquid reagent chamber conduit 216; a second liquid reagent chamber 203; a second liquid reagent chamber conduit 213 which fluidically connects the second liquid reagent chamber 203 to the measurement chamber 204 in an alternate flow direction to the sample chamber conduit 212; and a second liquid reagent chamber conduit valve 223 for opening and closing the second liquid reagent chamber conduit 223. In the embodiment shown in FIG. 2B, the first liquid reagent chamber conduit 216 connects to the measurement chamber 204 in the opposite flow direction to the sample chamber conduit 212 and the second liquid reagent chamber conduit connects to the measurement chamber at an alternate angle (e.g. ninety degrees) to both the sample chamber conduit 212 and the first liquid reagent chamber conduit 216.

Figure 2C:
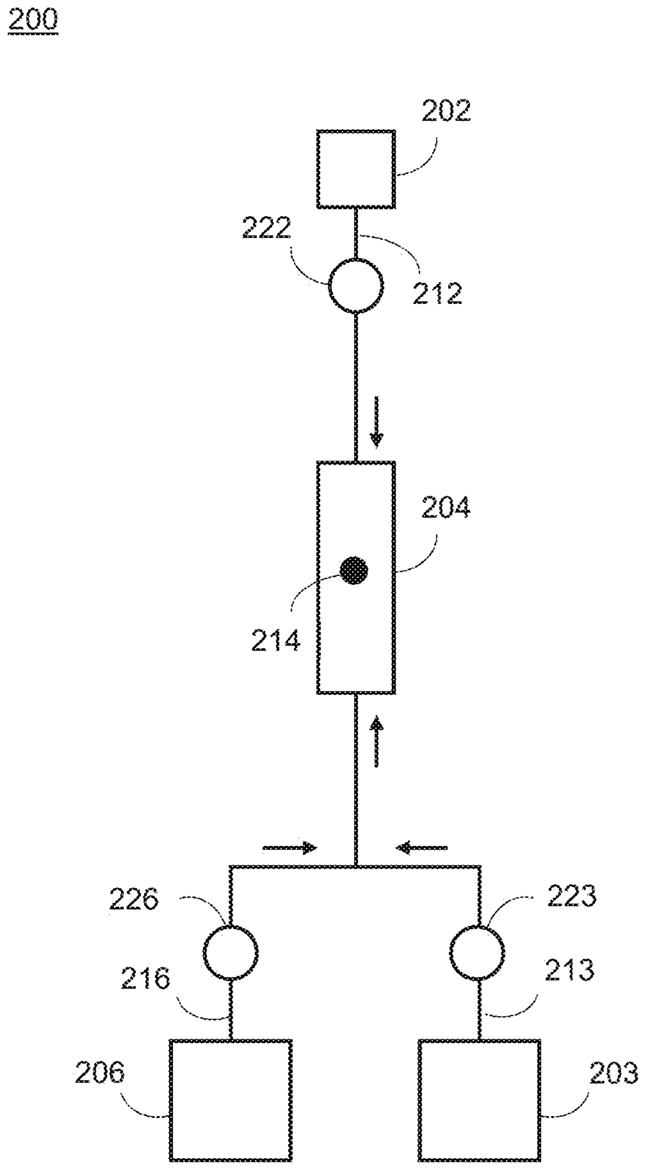
FIG. 2C illustrates a liquid handling device comprising a sample chamber, a measurement chamber and a first liquid reagent chamber and second liquid reagent chamber, both fluidically connected to the measurement chamber in an alternate flow direction to the sample chamber. This alternative configuration illustrates that the first liquid reagent chamber conduit and second liquid reagent chamber conduit can be joined to provide a single combined conduit, connected to the measurement chamber in an alternate flow direction to the sample chamber.

FIG. 2C illustrates a liquid handling device 200 similar to the device illustrated in FIG. 2A, wherein the first liquid reagent chamber conduit 216 and the second liquid reagent chamber conduit 213 are joined to form a combined conduit which enters the measurement chamber 204 in an alternate flow direction to the sample chamber conduit 212. The liquid handling device 200 comprises a sample chamber 202 for receiving a sample; one or more measurement chambers 204 for performing measurements on the sample, wherein the measurement chamber comprises a reaction zone 214; a sample chamber conduit 212 which fluidically connects the sample chamber 202 to the measurement chamber 204; a sample chamber conduit valve 222 for opening and closing the sample chamber conduit 212; a first liquid reagent chamber 206; a first liquid reagent chamber conduit 216; a first liquid reagent chamber conduit valve 226 for opening and closing the first liquid reagent chamber conduit 216; a second liquid reagent chamber 203; a second liquid reagent chamber conduit 213; a second liquid reagent chamber conduit valve 223 for opening and closing the second liquid reagent chamber conduit 223, wherein the first liquid reagent chamber conduit 216 and the second liquid reagent chamber conduit 213 are joined to form a combined conduit which fluidically connects both reagent chamber conduits to the measurement chamber 204 in an alternate flow direction to the sample chamber conduit 212. In the embodiment shown in FIG. 2B, the combined conduit connects to the measurement chamber 204 in the opposite flow direction to the sample chamber conduit 212.

Figure 3:
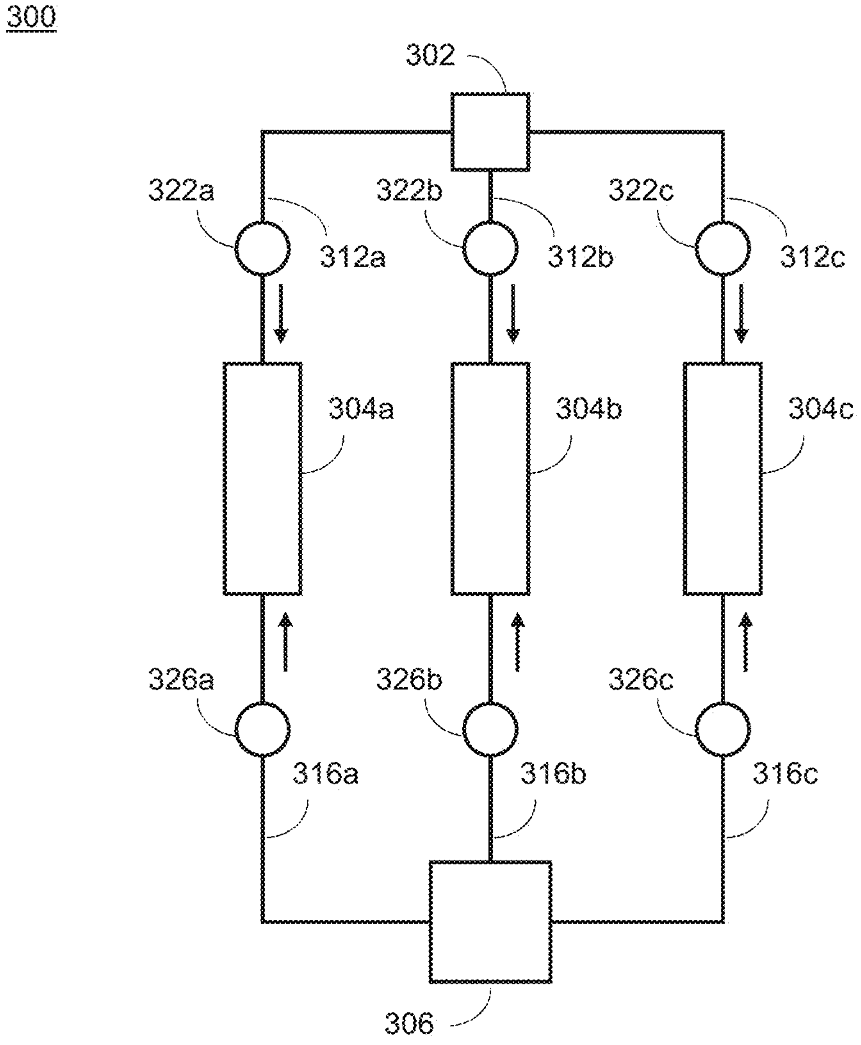
FIG. 3 illustrates a liquid handling device comprising a sample chamber, multiple measurement chambers and a first liquid reagent chamber, fluidically connected to each measurement chamber in an alternate flow direction to the sample chamber. Flow from both the sample chamber and first liquid reagent chamber is independently controllable into each measurement chamber.

FIG. 3 illustrates a liquid handling device 300 similar to the devices illustrated in FIGS. 1A and 1B, wherein the device comprises multiple measurement chambers. The liquid handling device 300 comprises a sample chamber 302 for receiving a sample; multiple measurement chambers 304*a*/304*b*/304*c* for performing measurements on the sample, wherein the measurement chambers optionally comprise a reaction zone (not shown in FIG. 3); a sample chamber conduit 312*a*/312*b*/312*c* which independently fluidically connects the sample chamber 302 to each of the measurement chambers 304*a*/304*b*/304*c*; a corresponding number of sample chamber conduit valves 322*a*/322*b*/322*c* for opening and closing the sample chamber conduit 312*a*/312*b*/312*c*; a first liquid reagent chamber 306; a first liquid reagent chamber conduit 316*a*/316*b*/316*c* which independently fluidically connects the first liquid reagent chamber 306 to each of the measurement chambers 304*a*/304*b*/304*c* in an alternate flow direction to the sample chamber conduit 312*a*/312*b*/312*c*; and a corresponding number of first liquid reagent chamber conduit valves 326*a*/326*b*/326*c* for opening and closing the first liquid reagent chamber conduit 316*a*/316*b*/316*c*. The sample chamber conduit valves 322*a*/322*b*/322*c* and first liquid reagent chamber conduit valves 326*a*/326*b*/326*c* allow for independent control of sample liquid and/or first liquid reagent in each of the measurement chambers.

Figure 4A:
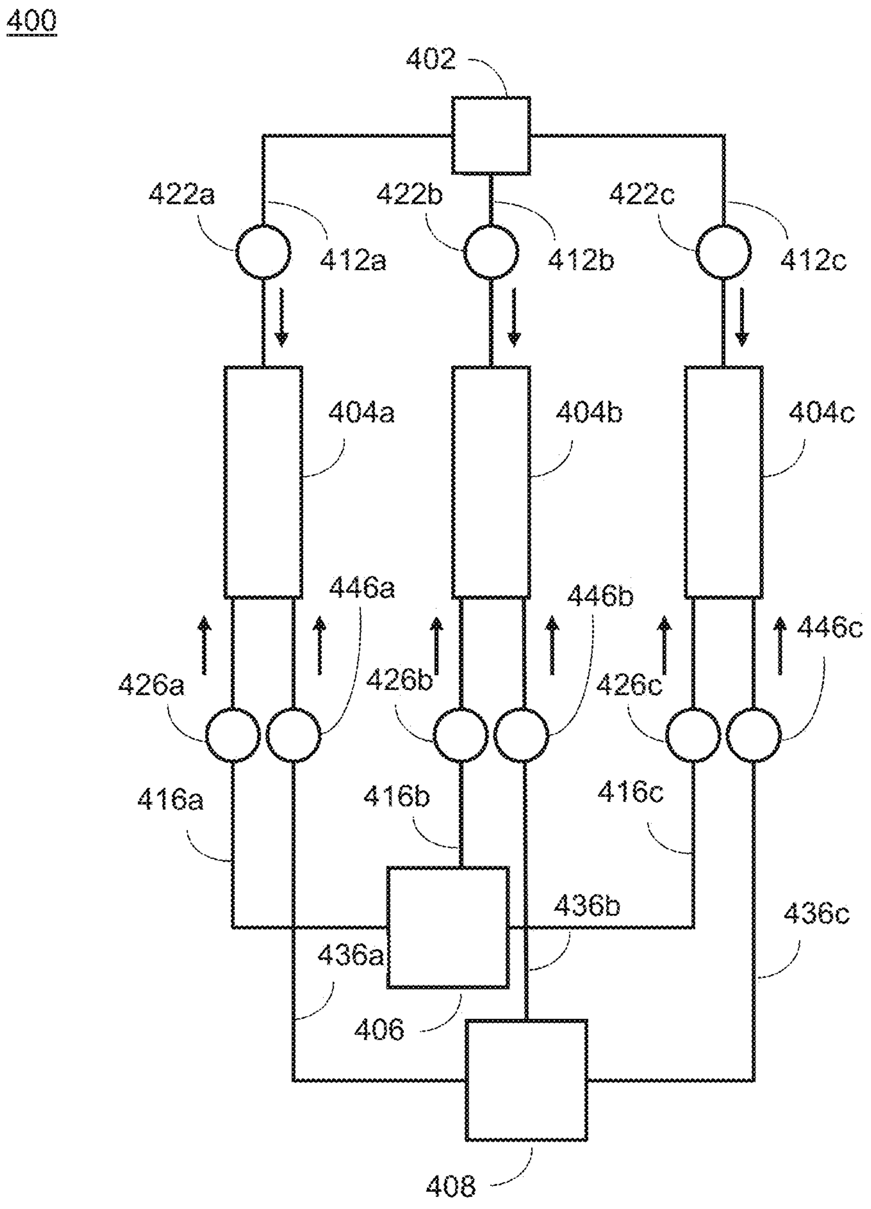
FIG. 4A illustrates a liquid handling device comprising a sample chamber, multiple measurement chambers and a first liquid reagent chamber and second liquid reagent chamber, both fluidically connected to each measurement chamber in an alternate flow direction to the sample chamber. Flow from each of the sample chamber, first liquid reagent chamber and second liquid reagent chamber is independently controllable into each measurement chamber.

FIG. 4A illustrates a liquid handling device 400 similar to the devices illustrated in FIG. 2A and FIG. 3, comprising a second fluid reagent chamber. The liquid handling device 400 comprises a sample chamber 402 for receiving a sample; multiple measurement chambers 404*a*/404*b*/404*c* for performing measurements on the sample, wherein the measurement chambers optionally comprise a reaction zone (not shown in FIG. 4A); a sample chamber conduit 412*a*/412*b*/412*c* which fluidically connects the sample chamber 402 to each measurement chamber 404*a*/404*b*/404*c*; a corresponding number of sample chamber conduit valves 422*a*/422*b*/422*c* for opening and closing the sample chamber conduit 412*a*/412*b*/412*c*; a first liquid reagent chamber 406; a first liquid reagent chamber conduit 416*a*/416*b*/416*c* which fluidically connects the first liquid reagent chamber 406 to each measurement chamber 404*a*/404*b*/404*c* in an alternate flow direction to the sample chamber conduit 412*a*/412*b*/412*c*; a corresponding number of first liquid reagent chamber conduit valves 426*a*/426*b*/426*c* for opening and closing the first liquid reagent chamber conduit 416*a*/416*b*/416*c*; a second liquid reagent chamber 408; a second liquid reagent chamber conduit 436*a*/436*b*/436*c* which fluidically connects the second liquid reagent chamber 408 to each measurement chamber 404*a*/404*b*/404*c* in an alternate flow direction to the sample chamber conduit 412*a*/412*b*/412*c*; and a corresponding number of second liquid reagent chamber conduit valves 446*a*/446*b*/446*c* for opening and closing the second liquid reagent chamber conduit 436*a*/436*b*/436*c*. In the embodiment shown in FIG. 4A, the first liquid reagent chamber conduit 416*a*/416*b*/416*c* and the second liquid reagent chamber conduit 436*a*/436*b*/436*c* connects to each measurement chamber 404*a*/404*b*/404*c* in the opposite flow direction to the sample chamber conduit 412*a*/412*b*/412*c*. In an alternative configuration, the first liquid reagent chamber conduit 416*a*/416*b*/416*c* and the second liquid reagent chamber conduit 436*a*/436*b*/436*c* can connect to each measurement chamber 404*a*/404*b*/404*c* at different flow directions, both of which may be alternative flow directions to the sample chamber conduit 412*a*/412*b*/412*c*.

Figure 4B:
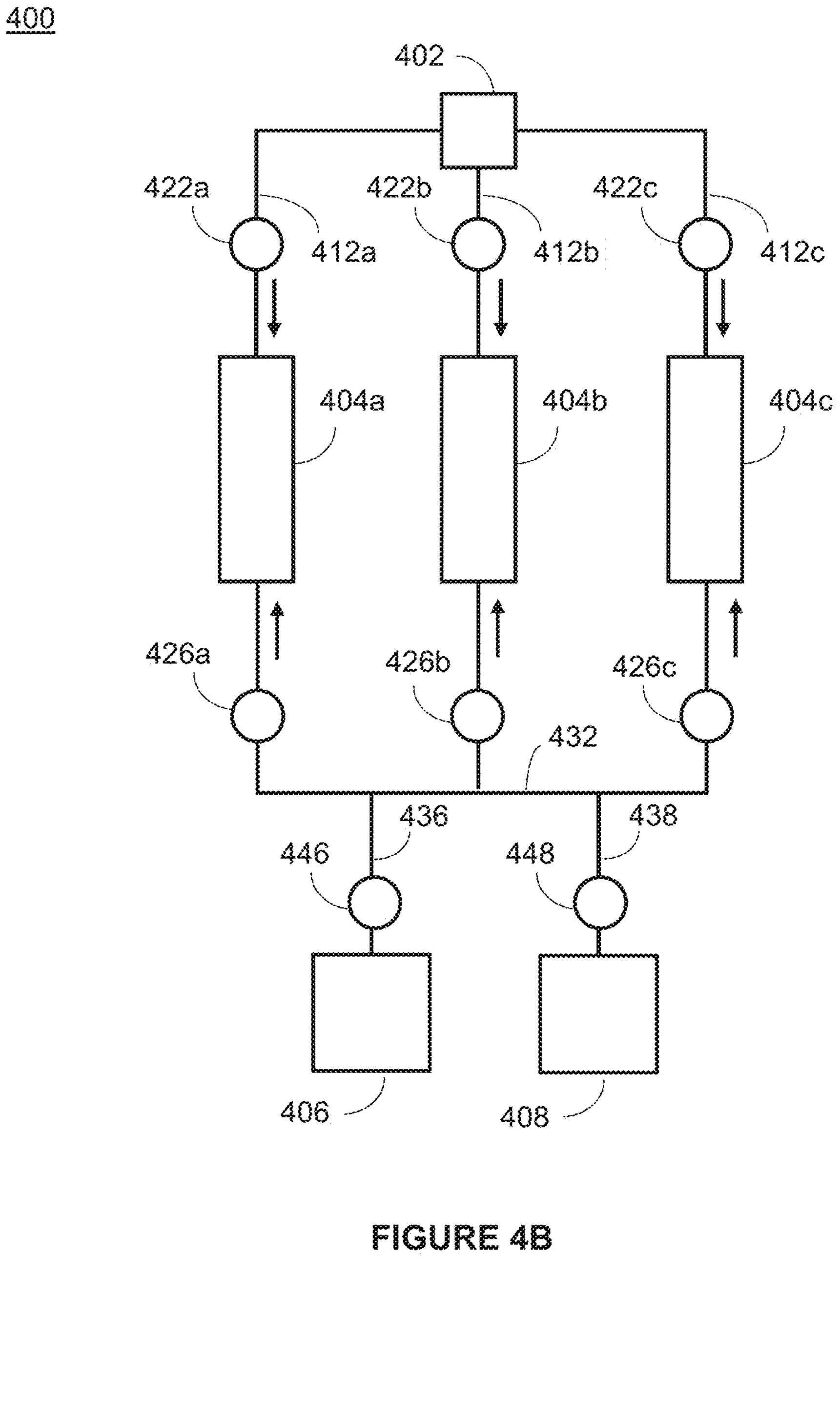
FIG. 4B illustrates a liquid handling device comprising a sample chamber, multiple measurement chambers and a first liquid reagent chamber and second liquid reagent chamber, both fluidically connected to each measurement chamber in an alternate flow direction to the sample chamber. Flow from each of the sample chamber, first liquid reagent chamber and second liquid reagent chamber is independently controllable into each measurement chamber. This alternative configuration illustrates that the first liquid reagent chamber conduit and second liquid reagent chamber conduit can be joined to provide a single combined conduit, connected to each measurement chamber in an alternate flow direction to the sample chamber.

FIG. 4B illustrates a liquid handling device 400 similar to the device illustrated in FIG. 4A, wherein the first liquid reagent conduit and the second liquid reagent conduit are joined to form a combined conduit that connects both chambers to each measurement chamber. The liquid handling device 400 comprises a sample chamber 402 for receiving a sample; multiple measurement chambers 404*a*/404*b*/404*c* for performing measurements on the sample, wherein the measurement chambers optionally comprise a reaction zone (not shown in FIG. 4A); a sample chamber conduit 412*a*/412*b*/412*c* which fluidically connects the sample chamber 402 to each measurement chamber 404*a*/404*b*/404*c*; a corresponding number of sample chamber conduit valves 422*a*/422*b*/422*c* for opening and closing the sample chamber conduit 412*a*/412*b*/412*c*; a first liquid reagent chamber 406; a first liquid reagent chamber conduit valve 446 for opening and closing the first liquid reagent chamber conduit 436; a second liquid reagent chamber 408; a second liquid reagent chamber conduit valve 448 for opening and closing the second liquid reagent chamber conduit 436, a combined conduit 432 which is fluidically connected to both the first liquid reagent conduit 436 and the second liquid reagent conduit 438, wherein the combined conduit is fluidically connected to each measurement chamber 404*a*/404*b*/404*c* in an alternate flow direction to the sample chamber conduit 412*a*/412*b*/412*c*. In the embodiment shown in FIG. 4B, the combined conduit 432 connects to each measurement chamber 404*a*/404*b*/404*c* in the opposite flow direction to the sample chamber conduit 412*a*/412*b*/412*c*. In an alternative configuration, the combined conduit 432 can connect to each measurement chamber 404*a*/404*b*/404*c* at an alternative flow direction (such as ninety degrees) to the sample chamber conduit 412*a*/412*b*/412*c*.

Figure 5A:
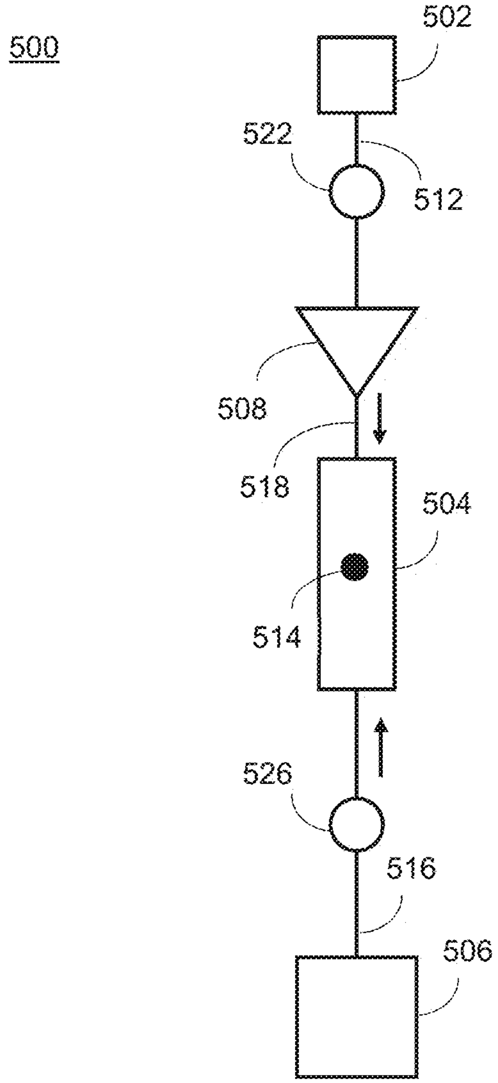
FIG. 5A illustrates a liquid handling device according to FIG. 1 comprising a sample chamber, a mixing zone, a measurement chamber and a first liquid reagent chamber fluidically connected to the measurement chamber in an alternate flow direction to the sample chamber.

FIG. 5A illustrates a liquid handling device 500 similar to the device illustrated in FIG. 1A, further comprising a mixing zone 508. The liquid handling device 500 comprises a sample chamber 502 for receiving a sample; a mixing zone 508, one or more measurement chambers 504 for performing measurements on the sample, wherein the measurement chamber comprises a reaction zone 514; a sample chamber conduit 512 which fluidically connects the sample chamber 502 to the mixing chamber 508; a sample chamber conduit valve 522 for opening and closing the sample chamber conduit 512; a mixing chamber conduit 518 which fluidically connects the mixing chamber 508 to the measurement chamber 504; a first liquid reagent chamber 506; a first liquid reagent chamber conduit 516 which fluidically connects the first liquid reagent chamber 506 to the measurement chamber 504 in an alternate flow direction to the sample chamber conduit 512; and a first liquid reagent chamber conduit valve 526 for opening and closing the first liquid reagent chamber conduit 516. In the embodiment shown in FIG. 5A, the first liquid reagent chamber conduit 516 connects to the measurement chamber 504 in the opposite flow direction to the mixing chamber conduit 518.

Figure 5B:
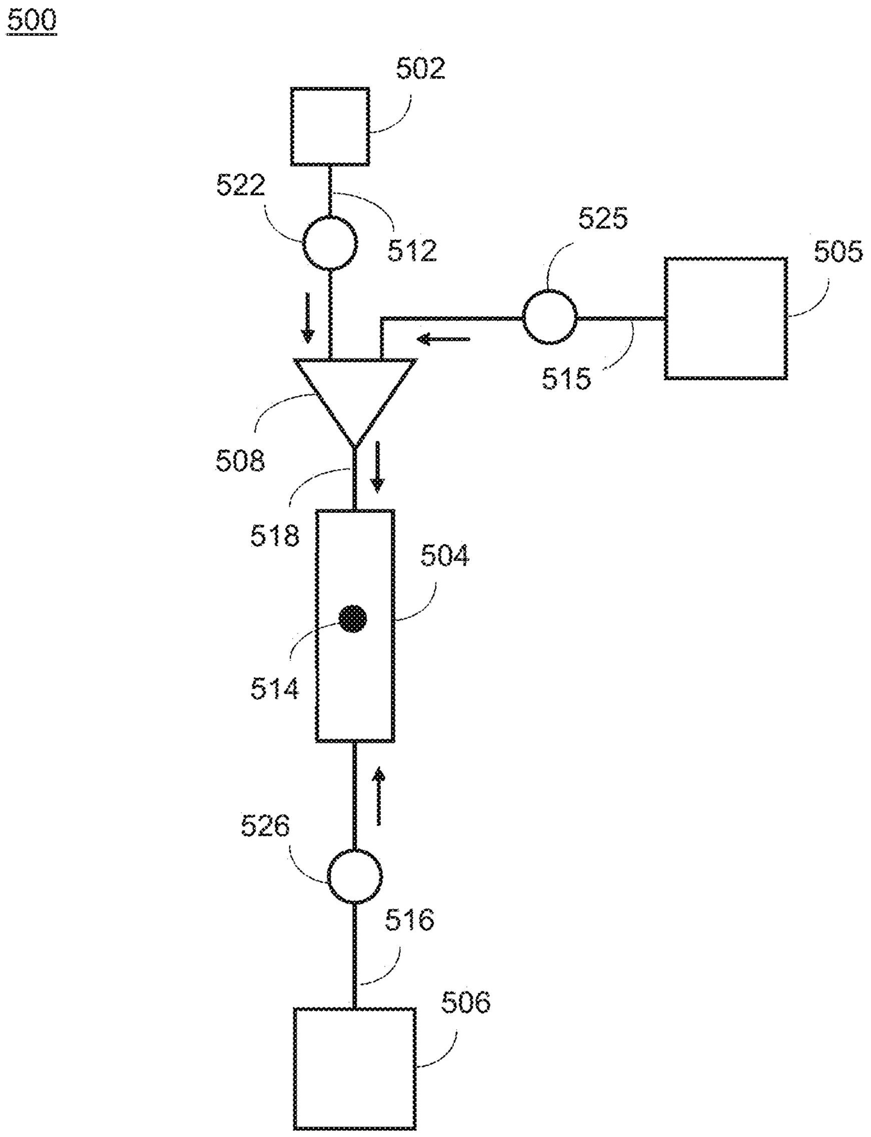
FIG. 5B illustrates a liquid handling device according to FIG. 1 comprising a sample chamber, a mixing zone, a measurement chamber, a first liquid reagent chamber fluidically connected to the measurement chamber in an alternate flow direction to the sample chamber and a third liquid reagent chamber fluidically connected to the mixing zone in an alternate flow direction to the sample chamber.

FIG. 5B illustrates a liquid handling device 500 similar to the device illustrated in FIG. 1B, further comprising a mixing zone 508 and a third liquid reagent chamber 505. The liquid handling device 500 comprises a sample chamber 502 for receiving a sample; a mixing zone 508, one or more measurement chambers 504 for performing measurements on the sample, wherein the measurement chamber comprises a reaction zone 514; a sample chamber conduit 512 which fluidically connects the sample chamber 502 to the mixing chamber 508; a sample chamber conduit valve 522 for opening and closing the sample chamber conduit 512; a mixing chamber conduit 518 which fluidically connects the mixing chamber 508 to the measurement chamber 504; a first liquid reagent chamber 506; a first liquid reagent chamber conduit 516 which fluidically connects the first liquid reagent chamber 506 to the measurement chamber 504 in an alternate flow direction to the sample chamber conduit 512; a first liquid reagent chamber conduit valve 526 for opening and closing the first liquid reagent chamber conduit 516; a third liquid reagent chamber 505; a third liquid reagent chamber conduit 515 which fluidically connects the third liquid reagent chamber 505 to the mixing chamber 508; and a third liquid reagent chamber conduit valve 525 for opening and closing the third liquid reagent chamber conduit 515. In the embodiment shown in FIG. 5B, the first liquid reagent chamber conduit 516 connects to the measurement chamber 504 in the opposite flow direction to the mixing chamber conduit 518. In the embodiment shown in FIG. 5B, the third liquid reagent chamber conduit 515 connects to the mixing chamber 508 at an alternative flow direction to the sample chamber conduit 512. In an alternative embodiment the third liquid reagent chamber conduit 515 could join the mixing chamber in the same flow direction as the sample chamber conduit 512.

Figure 6:
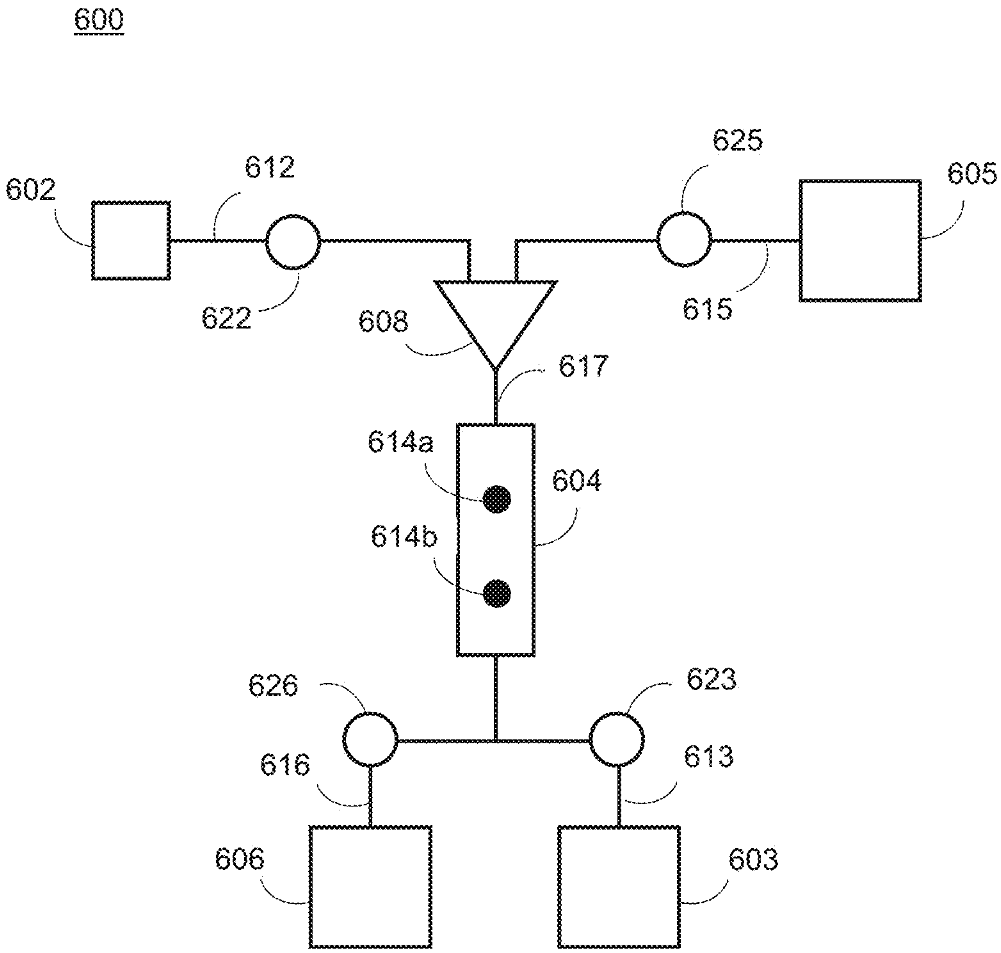
FIG. 6 illustrates a liquid handling device comprising a sample chamber, a mixing zone, a measurement chamber, and a first liquid reagent chamber and second liquid reagent chamber, both fluidically connected to the measurement chamber in an alternate flow direction to the sample chamber and a third liquid reagent chamber fluidically connected to the mixing zone in an alternate flow direction to the sample chamber. This configuration illustrates that the first liquid reagent chamber conduit and second liquid reagent chamber conduit can be joined to provide a single combined conduit, connected to the measurement chamber in an alternate flow direction to the sample chamber. Alternatively, the device of FIG. 6 may comprise a separate first liquid reagent chamber conduit and second liquid reagent chamber conduit.

FIG. 6 illustrates a liquid handling device 600 similar to the device illustrated in FIG. 2C and FIG. 5B, further comprising a mixing zone 608, a second liquid reagent chamber 603 and a third liquid reagent chamber 605. The liquid handling device 600 comprises a sample chamber 602 for receiving a sample; a mixing zone 608, one or more measurement chambers 604 for performing measurements on the sample, wherein the measurement chamber comprises one or more reaction zones 614*a*/614*b*; a sample chamber conduit 612 which fluidically connects the sample chamber 602 to the mixing chamber 608; a sample chamber conduit valve 622 for opening and closing the sample chamber conduit 612; a mixing chamber conduit 617 which fluidically connects the mixing chamber 608 to the measurement chamber 604; a first liquid reagent chamber 606; a first liquid reagent chamber conduit 616; a first liquid reagent chamber conduit valve 626 for opening and closing the first liquid reagent chamber conduit 616; a second liquid reagent chamber 603; a second liquid reagent chamber conduit 613; a second liquid reagent chamber conduit valve 623 for opening and closing the second liquid reagent chamber conduit 613; wherein the first liquid reagent chamber conduit 616 and the second liquid reagent chamber conduit 613 are joined to form a combined conduit which fluidically connects both reagent chamber conduits to the measurement chamber 604 in an alternate flow direction to the mixing chamber conduit 617; a third liquid reagent chamber 605; a third liquid reagent chamber conduit 615 which fluidically connects the third liquid reagent chamber 605 to the mixing chamber 608; and a third liquid reagent chamber conduit valve 625 for opening and closing the third liquid reagent chamber conduit 615. In the embodiment shown in FIG. 5B, the first liquid reagent chamber conduit and the second liquid reagent chamber are joined to form a combined conduit which connects to the measurement chamber 604 in an alternate flow direction to the mixing chamber conduit 617.

Figure 7:
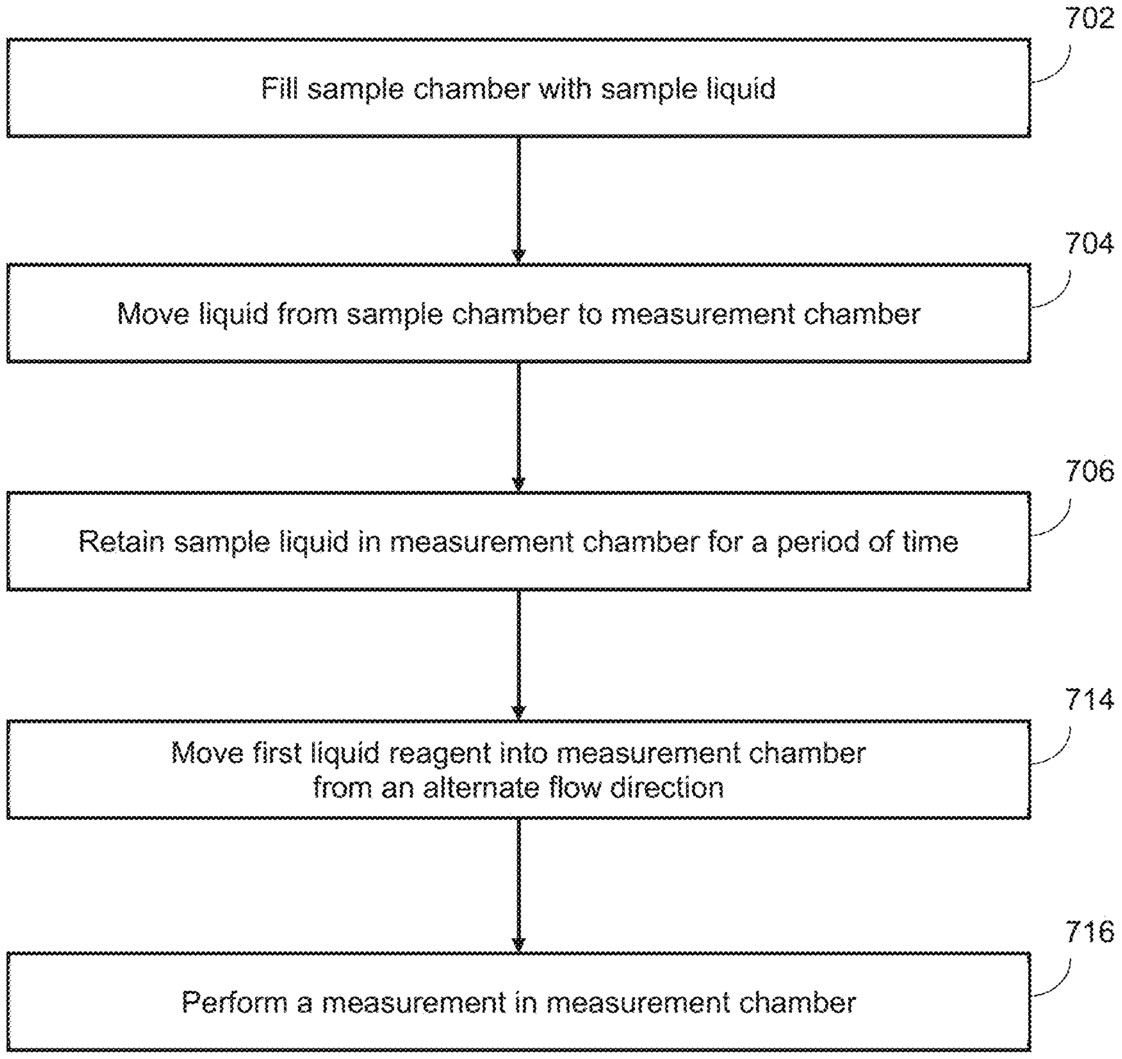
FIG. 7 illustrates a flow diagram for a method of operating a liquid handling device comprising a sample chamber, a measurement chamber and a first liquid reagent chamber.

FIG. 7 illustrates a flow diagram for a method of operating any of the liquid handling devices 100/200/300/400/500/600 described above and comprising at least a sample chamber 102/202/302/402/502/602, a measurement chamber 104/204/304/404/504/604 and a first liquid reagent chamber 106/206/306/406/506/606. The method is for transferring a sample liquid from the sample chamber to the measurement chamber and then moving a first liquid reagent from the first liquid reagent chamber to the measurement chamber in an alternate flow direction to the sample liquid, then performing a measurement.

When a sample has been inserted into the sample chamber 102/202/302/402/502/602 and the first liquid reagent chamber 106/206/306/406/506/606 contains a first liquid reagent, the method achieves the following:

a) opening the sample chamber conduit valve 122/222/322/422/522/622;
b) reducing a pressure in the measurement chamber 104/204/304/404/504/604 relative to the sample chamber 102/202/302/402/502/602;
c) closing the sample chamber conduit valve 122/222/322/422/522/622;
d) opening the first liquid reagent chamber conduit valve 126/226/326/426/526/626;
e) reducing a pressure in the measurement chamber relative to the first liquid reagent chamber;
f) closing the first liquid reagent chamber conduit valve 126/226/326/426/526/626;
g) performing a measurement in the measurement chamber.

Figure 8:
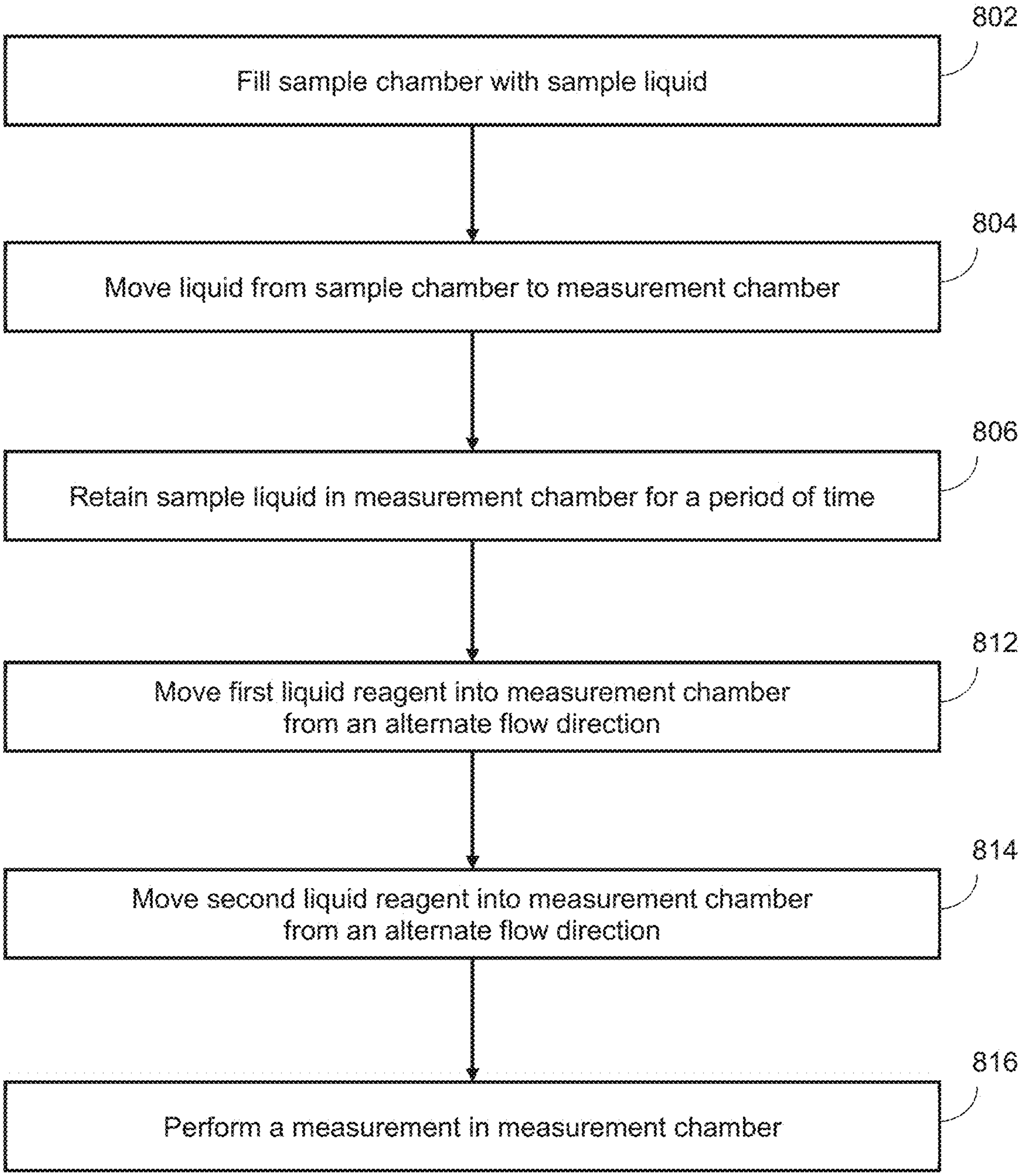
FIG. 8 illustrates a flow diagram for a method of operating a liquid handling device comprising a sample chamber, a measurement chamber, a first liquid reagent chamber and a second liquid reagent chamber.

FIG. 8 illustrates a flow diagram for a method of operating any of the liquid handling devices 100/200/300/400/500/600 described above and comprising at least a sample chamber 102/202/302/402/502/602, a measurement chamber 104/204/304/404/504/604, a first liquid reagent chamber 106/206/306/406/506/606 and a second liquid reagent chamber 203/408/603. The method is for transferring a sample liquid from the sample chamber to the measurement chamber, then moving a first liquid reagent from the first liquid reagent chamber to the measurement chamber in an alternate flow direction to the sample liquid, then moving a second liquid reagent from the second liquid reagent chamber to the measurement chamber in an alternate flow direction to the sample liquid (optionally wherein the flow direction of the second liquid reagent is also alternate to the flow direction of the first liquid reagent), and performing a measurement.

When a sample has been inserted into the sample chamber 102/202/302/402/502/602, the first liquid reagent chamber 106/206/306/406/506/606 contains a first liquid reagent and the second liquid reagent chamber 203/408/603 contains a second liquid reagent, the method achieves the following:

a) opening the sample chamber conduit valve 122/222/322/422/522/622;
b) reducing a pressure in the measurement chamber 104/204/304/404/504/604 relative to the sample chamber 102/202/302/402/502/602;
c) closing the sample chamber conduit valve 122/222/322/422/522/622;
d) opening the first liquid reagent chamber conduit valve 126/226/326/426/526/626;
e) reducing a pressure in the measurement chamber relative to the first liquid reagent chamber;
f) closing the first liquid reagent chamber conduit valve 126/226/326/426/526/626;
g) opening the second liquid reagent chamber conduit valve 223/446/448/623;
h) reducing a pressure in the measurement chamber relative to the second liquid reagent chamber;
i) closing the second liquid reagent chamber conduit valve 223/446/448/623;
j) performing a measurement in the measurement chamber.

Figure 9:
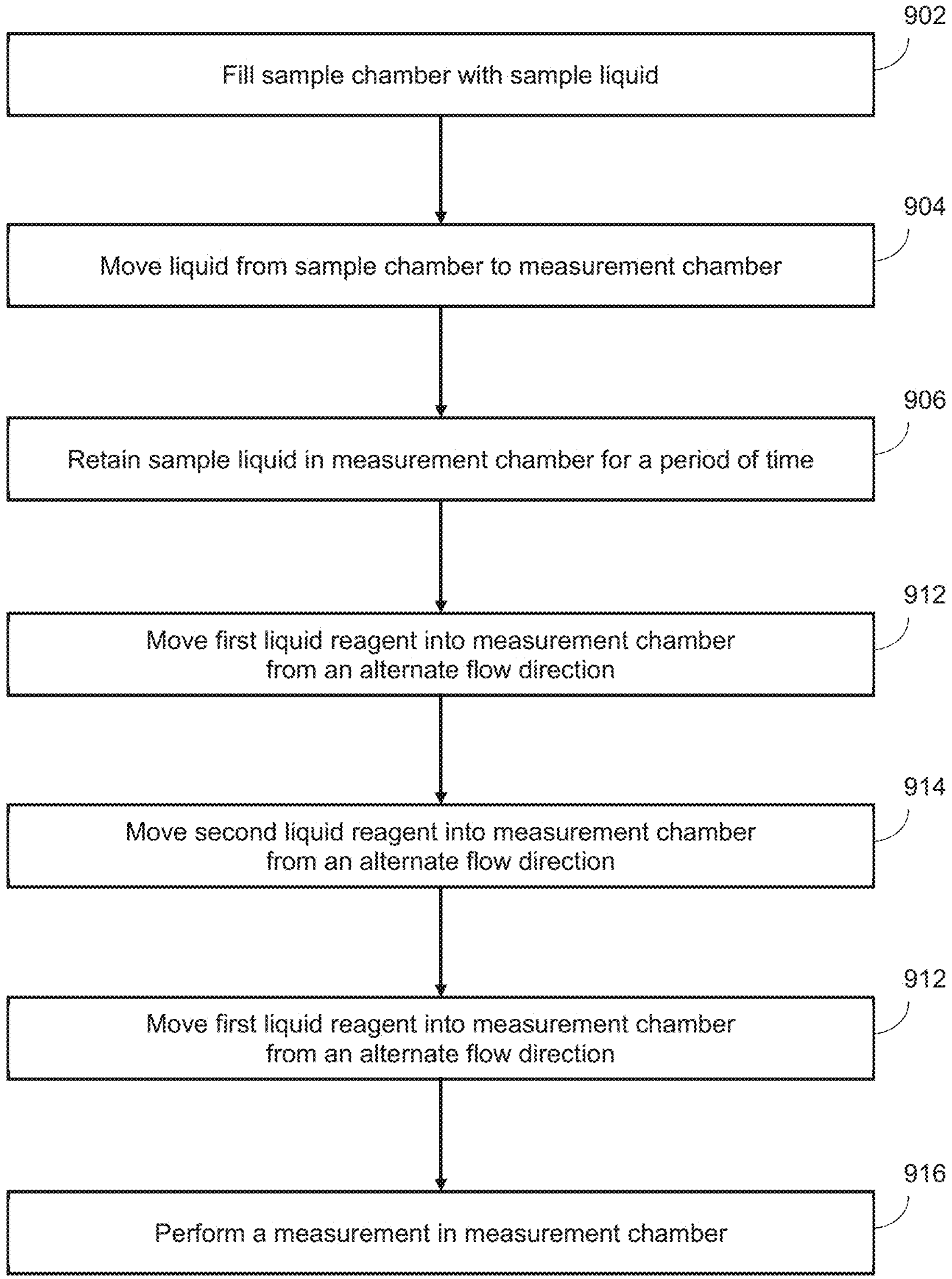
FIG. 9 illustrates a flow diagram for an alternative method of operating a liquid handling device comprising a sample chamber, a measurement chamber, a first liquid reagent chamber and a second liquid reagent chamber.

FIG. 9 illustrates a flow diagram for a method of operating any of the liquid handling devices 100/200/300/400/500/600 described above and comprising at least a sample chamber 102/202/302/402/502/602, a measurement chamber 104/204/304/404/504/604, a first liquid reagent chamber 106/206/306/406/506/606 and a second liquid reagent chamber 203/408/603. The method is for transferring a sample liquid from the sample chamber to the measurement chamber, then moving a first liquid reagent from the first liquid reagent chamber to the measurement chamber in an alternate flow direction to the sample liquid, then moving a second liquid reagent from the second liquid reagent chamber to the measurement chamber in an alternate flow direction to the sample liquid (optionally wherein the flow direction of the second liquid reagent is also alternate to the flow direction of the first liquid reagent), then moving a further amount of a first liquid reagent from the first liquid reagent chamber to the measurement chamber in an alternate flow direction to the sample liquid and performing a measurement.

When a sample has been inserted into the sample chamber 102/202/302/402/502/602, the first liquid reagent chamber 106/206/306/406/506/606 contains a first liquid reagent and the second liquid reagent chamber 203/408/603 contains a second liquid reagent, the method achieves the following:

a) opening the sample chamber conduit valve 122/222/322/422/522/622;
b) reducing a pressure in the measurement chamber 104/204/304/404/504/604 relative to the sample chamber 102/202/302/402/502/602;
c) closing the sample chamber conduit valve 122/222/322/422/522/622;
d) opening the first liquid reagent chamber conduit valve 126/226/326/426/526/626;
e) reducing a pressure in the measurement chamber relative to the first liquid reagent chamber;
f) closing the first liquid reagent chamber conduit valve 126/226/326/426/526/626;
g) opening the second liquid reagent chamber conduit valve 223/446/448/623;
h) reducing a pressure in the measurement chamber relative to the second liquid reagent chamber;
i) closing the second liquid reagent chamber conduit valve 223/446/448/623;

j) opening the first liquid reagent chamber conduit valve 126/226/326/426/526/626;

k) reducing a pressure in the measurement chamber relative to the first liquid reagent chamber;

l) closing the first liquid reagent chamber conduit valve 126/226/326/426/526/626;

m) performing a measurement in the measurement chamber.

The above-described methods can be performed in combination with each other, and in many different orders or multiple times, as required for a given diagnostic test. One method need not be completed before another method is performed.

The described methods may be implemented by a diagnostic system using computer executable instructions. A computer program product or computer readable medium may comprise or store the computer executable instructions. The computer program product or computer readable medium may comprise a hard disk drive, a flash memory, a read-only memory (ROM), a CD, a DVD, a cache, a random-access memory (RAM) and/or any other storage media in which information is stored for any duration (e.g. for extended time periods, permanently, brief instances, for temporarily buffering, and/or for caching of the information). A computer program may comprise the computer executable instructions. The computer readable medium may be a tangible or non-transitory computer readable medium. The term "computer readable" encompasses "machine readable".

Thus, also disclosed is a computer program comprising computer-executable instructions which, when executed by a diagnostic system, cause the diagnostic system to perform any of the methods described above.

Biological Samples

In the present invention, the sample liquid may be any suitable biological sample comprising diagnostic biomarkers of interest. In some embodiments, the sample liquid may be a whole blood sample, a serum sample, a saliva sample, a biopsy sample (such as a healthy tissue sample or a tumour sample), a urine sample, a semen sample, a tear sample, a sputum sample, a sweat sample, a mucous sample, a fecal sample, a gastric fluid sample, an abdominal fluid sample, an amniotic fluid sample, a cyst fluid sample, a peritoneal fluid sample, a spinal fluid sample or a synovial fluid sample, although whole blood samples are particularly useful. In a preferred embodiment of the invention the sample liquid is a whole blood sample. The method may include a step of obtaining or providing the biological sample, or alternatively the sample may have already been obtained from a subject, for example in ex vivo methods.

Biological samples obtained from a subject can be stored until needed. Suitable storage methods include freezing immediately, within 2 hours or up to two weeks after sample collection. Maintenance at −80° C. can be used for long-term storage. Preservative may be added, or the sample collected in a tube containing preservative. Preferably the sample is analysed immediately following collection.

Methods of the invention may comprise steps carried out on biological samples. The sample liquid is considered to be representative of the biomarker status of the biomarkers of interest in difference disease states. Hence the methods of the present invention may use quantitative data on biomarkers of interest, to determine the presence, absence or severity of different disease states.

The sample may be processed prior to determining the status of the biomarkers. The sample may be subject to enrichment (for example to increase the concentration of the biomarkers being quantified), centrifugation or dilution. In other embodiments, the samples do not undergo any pre-processing and are used unprocessed (such as whole blood).

In some embodiments of the invention, the biological sample may be fractionated or enriched for particular biomarkers prior to detection and quantification (i.e. measurement). The step of fractionation or enrichment can be any suitable pre-processing method step to increase the concentration of a biomarker of interest in the sample. For example, the steps of fractionation and/or enrichment may comprise centrifugation and/or filtration to remove cells or unwanted analytes from the sample, or to increase the concentration of biomarkers of interest in a particular blood fraction. Such methods may be used to enrich the sample for any biomarkers of interest.

The methods of the invention may be carried out on one test sample from a subject. Alternatively, a plurality of test samples may be taken from a subject, for example at least 2, at least 3, at least 4 or at least 5 samples from a subject. Each sample may be subjected to a single assay to quantify one of the biomarker panel members, or alternatively a sample may be tested for all of the biomarkers being quantified. Each sample may be subjected to a separate analysis using a method of the invention, or alternatively multiple samples from a single subject undergoing diagnosis could be included in the method.

A "sample(s)", "one or more samples", sample liquid, or "sample(s) of interest" are terms used interchangeably in singular or plural form and are not intended to be limited to any particular quantity and, as used herein, may be any molecule or substance that the user wishes to gather information from. A sample may become larger or smaller (e.g., by way of inflation or partitioning, respectively) in size, volume or content during the performance of an assay. Accordingly, a sample may be amplified and/or subdivided one or more times during the performance of an assay. In some embodiments, the sample comprises biomarkers of interest.

A "liquid", as used herein, is any aqueous or lipophilic phase capable of flowing freely. The liquid may further comprise one or more reagents, reaction components or samples of interest selected from cells (including any eukaryotic or prokaryotic cells, including but not limited to cells selected from humans, animals, plants, fungi, bacteria, viruses, protozoa, yeasts, molds, algae, rickettsia, and prions); proteins, peptides, antibodies, nucleic acid sequences, oligonucleotide probes, polymerase enzymes, buffers, dNTPs, organic and inorganic chemicals, and fluorescent dyes.

The embodiments are not limited to a microfluidic scale but applications on other, for example macroscopic scales, are equally envisaged. For the avoidance of doubt, the term "microfluidic" is referred to herein to mean devices having a fluidic element such as a reservoir or a channel with at least one dimension below 1 mm.

Example 1

Figure 10:
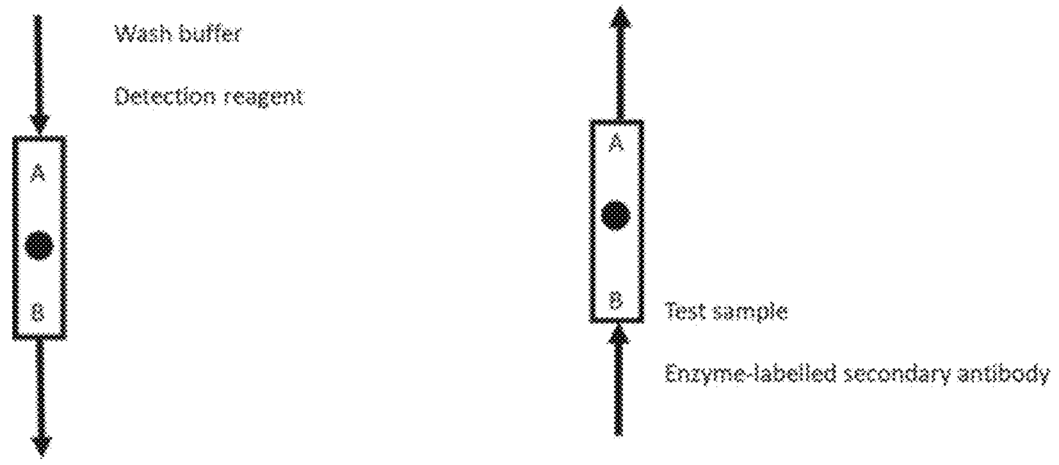
FIG. 10 illustrates the novel design comprising an assay workflow that introduces reagents through both port A and port B.

D-dimer is a small protein fragment that results from fibrin degradation. A D-dimer test is a blood test that can be used to exclude the presence of a serious blood clot. The performance of a D-dimer assay on an electrochemical biosensor was evaluated using two different liquid flow configurations in the same liquid flow system to deliver reagents to the flow cell of an electrochemical biosensor. Each configuration was compared to a control setup using manual filling of the flow cell with a micropipette. For the conventional unidirectional liquid flow only one flow direction (B to A) was used. All assay solutions were loaded sequentially from the B side of the flow cell. These include test sample, enzyme labelled secondary antibody, wash buffer and detection reagents. For the bidirectional liquid flow the test sample and the enzyme labelled secondary antibody were added from the B side of the flow cell (B to A), while the wash buffer and the detection reagent were added from the A side of the flow cell (A to B—FIG. 10).

Figure 11A:
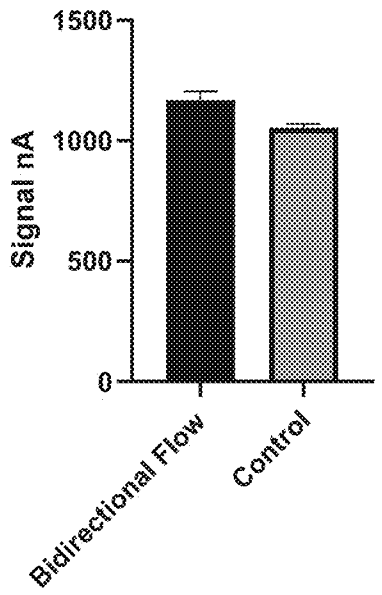
FIG. 11A illustrates D-Dimer assay performance compared to a control manual method when adding reagents from both directions.
Figure 11B:
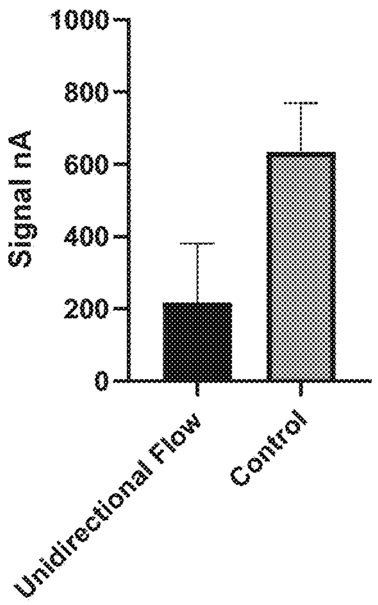
FIG. 11B illustrates D-Dimer assay performance compared to a control manual method when adding all reagents from one direction.
Figure 12:
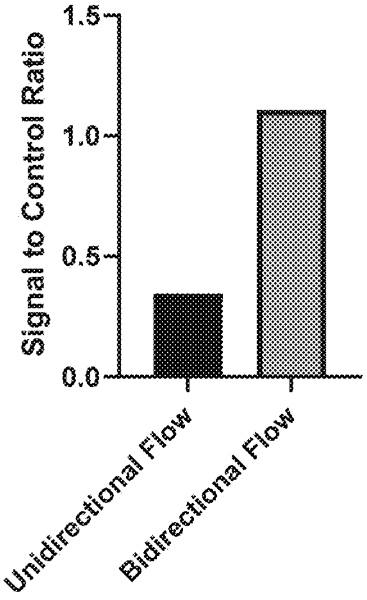
FIG. 12 illustrates D-Dimer assay performance, as measured by signal to control ratio, directly comparing a unidirectional flow configuration to a bidirectional flow configuration. The signal to control ratio is higher when using a bidirectional flow configuration, which indicates better assay performance.
Figure 13:
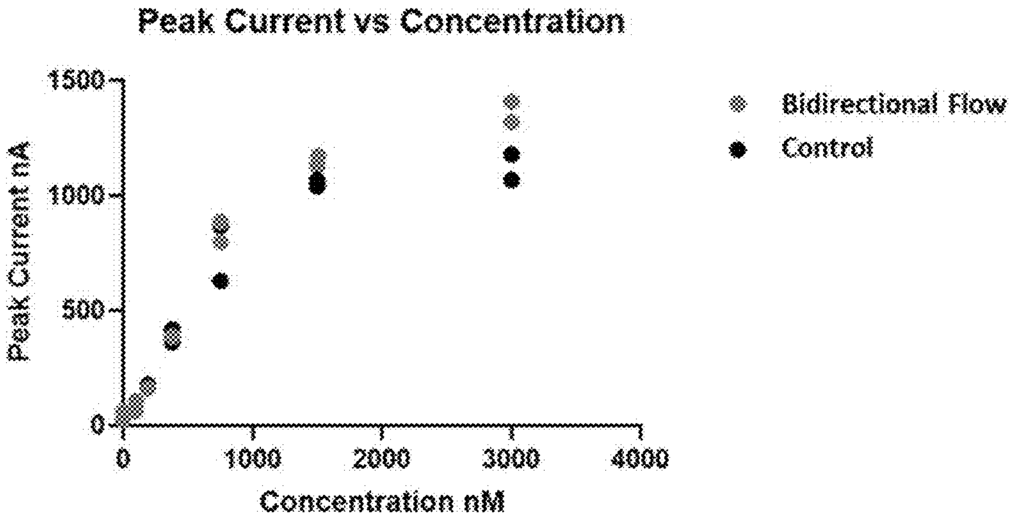
FIG. 13 illustrates peak current versus concentration over a concentration range for the D-Dimer assay using a bidirectional flow configuration and a control configuration.

As shown in FIG. 11A the signal obtained for a D-Dimer concentration of 1500 ng/mL for the assay using the bidirectional flow configuration is higher than for the control assay. Conversely, and as shown in FIG. 11B, the signal obtained for the same D-Dimer concentration using the unidirectional flow configuration is significantly lower than for the control assay. The performance of the assay when using bidirectional flow is improved significantly compared to when using unidirectional flow, as measured by signal to control ratio (FIG. 12). FIG. 13 shows the comparison between calibration curves obtained using the bidirectional flow configuration and the control method. Test samples were prepared using fetal bovine serum (FBS) as a matrix for spiking D-Dimer at concentrations ranging from 0-3000 ng/mL. Biosensors were functionalised with capture antibody solution during a one-hour incubation.

The following assay workflow was used:

1. Wash with buffer
2. Incubate for 5 minutes with test sample pre-mixed with enzyme labelled detection antibody
3. Wash with buffer
4. Incubate for 2 minutes with detection reagent
5. Wash with buffer
6. Perform differential pulse voltammetry (DPV) measurement The poor signal to noise ratio of the unidirectional flow configuration did not allow the generation of data for a calibration curve. The equivalence of the results obtained with the bidirectional flow configuration and the control method demonstrate the clear advantage of the bidirectional flow configuration over unidirectional flow.

The embodiments of the invention shown in the drawings and described above are exemplary embodiments only and are not intended to limit the scope of the appended claims, including any equivalents as included within the scope of the claims. Various modifications are possible and will be readily apparent to the skilled person in the art. It is intended that any combination of non-mutually exclusive features described herein are within the scope of the present invention. That is, features of the described embodiments can be combined with any appropriate aspect described above and optional features of any one aspect can be combined with any other appropriate aspect.

Further embodiments of the present invention are described below:

1. A liquid handling device comprising:
   - a sample chamber for receiving a sample;
   - a measurement chamber for performing one or more measurements on the sample wherein the measurement chamber comprises a reaction zone;
   - a first liquid reagent chamber;
   - a sample chamber conduit which fluidically connects the sample chamber to the measurement chamber;
   - a sample chamber conduit valve for opening and closing the sample chamber conduit;
   - a first liquid reagent chamber conduit which fluidically connects the first liquid reagent chamber to the measurement chamber in an alternate flow direction to the sample chamber conduit; and
   - a first liquid reagent chamber conduit valve for opening and closing the first liquid reagent chamber conduit.
2. The liquid handling device of embodiment 1 wherein the flow direction of the first liquid reagent chamber conduit is at least ninety degrees to the flow direction of the sample chamber conduit, preferably wherein the flow direction of the first liquid reagent chamber conduit is opposite to the flow direction of the sample chamber conduit.
3. The liquid handling device of any previous embodiment, wherein the device further comprises:
   - a second liquid reagent chamber;
   - a second liquid reagent chamber conduit which fluidically connects the second liquid reagent chamber to the measurement chamber in an alternate flow direction to the sample chamber conduit; and
   - a second liquid reagent chamber conduit valve for opening and closing the second liquid reagent chamber conduit.
4. The liquid handling device of embodiment 3 wherein the second liquid reagent chamber conduit fluidically connects to the measurement chamber in an alternate direction to both the sample chamber conduit and the first liquid reagent chamber conduit.
5. The liquid handling device of embodiment 3 wherein the second liquid reagent chamber conduit is fluidically connected to the first liquid reagent chamber conduit thereby providing a combined conduit, fluidically connecting both the first liquid reagent chamber and second liquid reagent chamber to the measurement chamber.
6. The liquid handling device of embodiment 5 wherein the flow direction of the combined conduit into the measurement chamber is at least ninety degrees to the flow direction of the sample chamber conduit into the measurement chamber.
7. The liquid handling device of embodiment 5 or 6 wherein the flow direction of the combined conduit into the measurement chamber is opposite to the flow direction of the sample chamber conduit into the measurement chamber.
8. The liquid handling device of embodiment 4 wherein the flow direction of the second liquid reagent chamber conduit into the measurement chamber is at least ninety degrees to the flow direction of the sample chamber conduit and/or the first liquid chamber conduit into the measurement chamber.
9. The liquid handling device of embodiment 8 wherein the flow direction of the second liquid reagent chamber conduit into the measurement chamber is opposite to the flow direction of the sample chamber conduit and/or the first liquid chamber conduit into the measurement chamber.
10. The liquid handling device of any previous embodiment wherein the reaction zone comprises one or more electrodes.
11. The liquid handling device of embodiment 10 wherein the one or more electrodes comprise one or more electrodes selected from the list: counter electrode, reference electrode and working electrode.
12. The liquid handling device of embodiment 10 or 11 wherein the one or more electrodes comprise at least one working electrode.
13. The liquid handling device of any previous embodiment wherein the device comprises two or more measurement chambers, each of which is fluidically connected to the sample chamber and each of which is fluidically connected to the first liquid reagent chamber,
wherein the device comprises a corresponding number of sample chamber conduit valves and/or first liquid reagent chamber valves for independent control of the flow of sample liquid and/or first liquid reagent into each measurement chamber.

14. The liquid handling device of embodiment 13, wherein the device further comprises a second liquid reagent chamber and wherein each of the measurement chambers is fluidically connected to the second liquid reagent chamber, and
wherein the device comprises a corresponding number of second liquid reagent chamber conduit valves for independent control of the flow of second liquid reagent into each measurement chamber.

15. The liquid handling device of embodiment 14, wherein the second liquid reagent chamber conduit is fluidically connected to the first liquid reagent chamber conduit thereby providing one or more combined conduits fluidically connecting both the first liquid reagent chamber and second liquid reagent chamber to each measurement chamber.

16. The liquid handling device of any previous embodiment, wherein the flow of any one or more of the sample liquid, first liquid reagent and/or the second liquid reagent into each of the measurement chambers can be independently controlled to regulate the residence time of each liquid in each of the measurement chambers.

17. The liquid handling device of embodiment 16 wherein the flow of any one or more of the sample liquid, first liquid reagent and/or the second liquid reagent is controlled such that the residence time of each liquid is a predetermined period of time.

18. The liquid handling device of any previous embodiment, wherein the device further comprises:
a mixing zone located between the sample chamber and the measurement chamber and wherein the mixing zone is fluidically connected to both the sample chamber and the measurement chamber.

19. The liquid handling device of embodiment 18, wherein the mixing zone comprises a mixing chamber, wherein the mixing chamber is fluidically connected to the sample chamber conduit and to the measurement chamber by a mixing chamber conduit.

20. The liquid handling device of any one of embodiments 18 or 19 wherein the device further comprises:
a third liquid reagent chamber;
a third liquid reagent chamber conduit which fluidically connects the third liquid reagent chamber to the mixing zone, optionally wherein the third liquid reagent chamber conduit connects to the mixing zone in an alternate flow direction to the sample chamber conduit; and
a third liquid reagent chamber conduit valve for opening and closing the third liquid reagent chamber conduit.

21. A method of performing a diagnostic assay comprising sequentially moving liquid from a sample chamber to a measurement chamber and moving a first liquid reagent into the measurement chamber from an alternate flow direction, the method including:
filling the sample chamber with sample liquid;
moving sample liquid from the sample chamber to the measurement chamber;
retaining the sample liquid in the measurement chamber for a predetermined period of time,
moving a first liquid reagent from a first liquid reagent chamber into the measurement chamber in an alternate flow direction to the sample chamber liquid and taking a measurement, optionally wherein the first liquid reagent is retained in the measurement chamber for a predetermined period of time.

22. The method of embodiment 21 wherein the first liquid reagent is removed from the measurement chamber before the measurement is taken.

23. The method of embodiment 21 or embodiment 22, further comprising a step of moving liquid from a second liquid reagent chamber to the measurement chamber in an alternate flow direction to sample liquid.

24. A method of performing a diagnostic assay comprising sequentially moving liquid from a sample chamber to a measurement chamber and moving a first and second liquid reagent into the measurement chamber from an alternate flow direction, the method including:
filling the sample chamber with sample liquid;
moving sample liquid from the sample chamber to the measurement chamber;
retaining the sample liquid in the measurement chamber for a predetermined period of time,
moving a first liquid reagent from a first liquid reagent chamber into the measurement chamber in an alternate flow direction to the sample liquid;
moving a second liquid reagent from a second liquid reagent chamber into the measurement chamber in an alternate flow direction to the sample liquid and performing a measurement, optionally wherein the first and second liquid reagents are each retained in the measurement chamber for a predetermined period of time.

25. The method of embodiment 24 wherein the second liquid reagent is removed from the measurement chamber before the measurement is taken.

26. A method of performing a diagnostic assay comprising sequentially moving liquid from a sample chamber to a measurement chamber and moving a first and second liquid reagent into the measurement chamber from an alternate flow direction, the method including:
filling the sample chamber with sample liquid;
moving sample liquid from the sample chamber to the measurement chamber;
retaining the sample liquid in the measurement chamber for a predetermined period of time,
moving a first liquid reagent from a first liquid reagent chamber into the measurement chamber in an alternate flow direction to the sample liquid;
moving a second liquid reagent from a second liquid reagent chamber into the measurement chamber in an alternate flow direction to the sample liquid;
moving a further volume of the first liquid reagent from the first liquid reagent chamber into the measurement chamber in an alternate flow direction to the sample liquid and performing a measurement, optionally wherein the first and second liquid reagents are each retained in the measurement chamber for a predetermined period of time.

27. The method of any one of embodiments 21-26 wherein the flow direction of the first liquid reagent and/or the second liquid reagent is at least ninety degrees to the flow direction of the sample liquid into the measurement chamber, preferably wherein the flow direction of the first liquid reagent and/or second liquid reagent is opposite to the flow direction of the sample liquid.

28. The method of any one of embodiments 21-27, further comprising a step of mixing the sample liquid with one or more additional reagents before moving the sample liquid into the measurement chamber.

29. The method of embodiment 28 wherein the sample liquid is mixed in a mixing zone with a third liquid reagent from a third liquid reagent chamber.

30. A method of implementing the method described in any one of embodiments 21-29 on a device of any one of embodiments 1-20.

31. The liquid handling device of any one of embodiments 1-20 or the method of any one of embodiments 21-30 wherein the first liquid reagent is any liquid composition suitable for use as a washing liquid in immunoassays, for example a wash buffer.

32. The liquid handling device or the method of embodiment 31 wherein the first liquid reagent is a liquid comprising one or more reagents selected from the list of a pH buffer (e.g. PBS, Tris, carbonate/bicarbonate, HEPES, MOPS, MES), a salt solution (e.g. NaCl, KCl, $MgCl_2$), a detergent (e.g. Tween 20, Tween 80, Triton-X, CHAPS) and a stabilizer/blocking agent (e.g. BSA, casein).

33. The liquid handling device or the method of embodiment 32 wherein the first liquid reagent is Tris-buffered saline (TBS) and phosphate-buffered saline (PBS) containing 0.05% (v/v) Tween®-20.

34. The liquid handling device of any one of embodiments 1-20 and 31-33 or the method of any one of embodiments 21-33 wherein the second liquid reagent is a detection reagent for use in immunoassays.

35. The liquid handling device or method of embodiment 34 wherein the second liquid reagent comprises one or more reagents selected from DAB (3,3'-diaminobenzidine), metal-enhanced DAB, AEC (3-amino-9-ethylcarbazole), BCIP (5-bromo-4-chloro-3-indolyl phosphate), NBT (nitro-blue tetrazolium chloride), TMB (3,3',5,5'-tetramethylbenzidine), ELF (enzyme-labelled fluorescence) and OPD (ophenylenediamine dihydrochloride), preferably wherein the second liquid reagent comprises 3,3',5,5'-Tetramethylbenzidine (TMB).

36. The liquid handling device of any one of embodiments 1-20 and 31-35 or the method of any one of embodiments 21-35 wherein the predetermined period of time is from 1 to 180 seconds (e.g. 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179 or 180 seconds).

37. The liquid handling device of any one of embodiments 1-20 and 31-36 or the method of any one of embodiments 21-36 wherein the predetermined period of time is from 1 to 60 seconds (e.g. 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 seconds).

38. The liquid handling device of any one of embodiments 1-20 and 31-37 or the method of any one of embodiments 21-37 wherein the predetermined period of time is from 10 to 30 seconds (e.g. 10, 11, 12, 13, 14, 15, 16, 17, 18, 19, 20, 21, 22, 23, 24, 25, 26, 27, 28, 29 or 30 seconds).

39. The liquid handling device of any one of embodiments 1-20 and 31-36 or the method of any one of embodiments 21-36 wherein the predetermined period of time is from 60 to 180 seconds (e.g. 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179 or 180 seconds).

40. A computer program comprising computer-executable instructions which, when executed by a system, cause the system to perform the method according to any of embodiments 21 to 39.

41. A system comprising a processor configured to execute the computer program according to embodiment 40.

The invention claimed is:

1. A method of performing a diagnostic assay comprising sequentially moving a sample liquid from a sample chamber to a measurement chamber and moving a first liquid reagent into the measurement chamber from an alternate flow direction, the method including:

filling the sample chamber with the sample liquid;

moving the sample liquid from the sample chamber to the measurement chamber;

retaining the sample liquid in the measurement chamber for a predetermined period of time;

moving the first liquid reagent from a first liquid reagent chamber into the measurement chamber in an alternate flow direction to the sample chamber liquid; and taking a measurement, optionally wherein the first liquid reagent is retained in the measurement chamber for a predetermined period of time, wherein the first liquid reagent is removed from the measurement chamber before the measurement is taken.

2. The method of claim 1, further comprising a step of moving a liquid from a second liquid reagent chamber to the measurement chamber in an alternate flow direction to sample liquid.

3. A method of performing a diagnostic assay comprising sequentially moving a sample liquid from a sample chamber to a measurement chamber and moving a first and second liquid reagent into the measurement chamber from an alternate flow direction, the method including:

filling the sample chamber with the sample liquid;

moving the sample liquid from the sample chamber to the measurement chamber;

retaining the sample liquid in the measurement chamber for a predetermined period of time;

moving the first liquid reagent from a first liquid reagent chamber into the measurement chamber in an alternate flow direction to the sample liquid;

moving the second liquid reagent from a second liquid reagent chamber into the measurement chamber in an alternate flow direction to the sample liquid and performing a measurement, optionally wherein the first and second liquid reagents are each retained in the measurement chamber for a predetermined period of time, wherein the second liquid reagent is removed from the measurement chamber before the measurement is taken.

4. A computer program comprising computer-executable instructions which, when executed by a system, cause the system to perform the method according to any of claim 1.

5. A system comprising a processor configured to execute the computer program according to claim 4.

6. A computer program comprising computer-executable instructions which, when executed by a system, cause the system to perform the method according to any of claim 3.

7. A system comprising a processor configured to execute the computer program according to claim 6.

* * * * *